United States Patent [19]

Noguchi et al.

[11] 4,034,733

[45] July 12, 1977

[54] INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[21] Appl. No.: 557,371

[22] Filed: Mar. 11, 1975

[30] Foreign Application Priority Data

| Mar. 12, 1974 | Japan | 49-28875 |
| June 7, 1974 | Japan | 49-65352 |
| June 25, 1974 | Japan | 49-72941 |

[51] Int. Cl.² .................. F02B 19/10; F02B 3/00; F02B 19/18
[52] U.S. Cl. .................. 123/32 SP; 123/32 EB; 123/139 AW; 123/127; 123/32 CL; 123/191 SP
[58] Field of Search ....... 123/32 ST, 32 SP, 32 EA, 123/127, 75 B, 139 AW, 191 S, 191 SP, 32 EB, 32 L

[56] References Cited

U.S. PATENT DOCUMENTS

| 3,174,470 | 3/1965 | von Seggern | 123/32 SP |
| 3,255,739 | 6/1966 | von Seggern | 123/32 SP |
| 3,270,721 | 9/1966 | Hideg | 123/32 SP |
| 3,283,751 | 11/1966 | Goossak | 123/32 SP |
| 3,734,068 | 5/1973 | Reddy | 123/32 EA |
| 3,788,285 | 1/1974 | Gelin | 123/32 EA |
| 3,824,965 | 7/1974 | Clawson | 123/32 SP |
| B 302,692 | 1/1975 | Davis | 123/32 SP |

*Primary Examiner*—Ronald B. Cox
*Attorney, Agent, or Firm*—Cushman, Darby & Cushman

[57] ABSTRACT

The invention disclosed is an internal combustion engine of the type having a main combustion chamber for combustion of the lean mixture; a trap chamber for trapping therein the rich mixture; a spark plug for igniting the rich mixture in the trap chamber; and a fuel injection system including a first fuel injection nozzle opening at an intake passage to each cylinder for injecting the fuel toward the trap chamber during the suction stroke, a second fuel injection nozzle opening at a throttle body or an intake manifold for injecting the fuel during any one of strokes, and a fuel injection control device for controlling the injection timing and period of the first and second fuel injection nozzles. The positive and complete stratified combustion of the mixture, in which the fuel has been satisfactorily vaporized, may be ensured not only at during starting and during warming-up or during operation in cold weather but also under any other operating conditions without resulting in a slow engine response during the transition period and an undesirable non-uniform distribution of the mixture.

15 Claims, 33 Drawing Figures

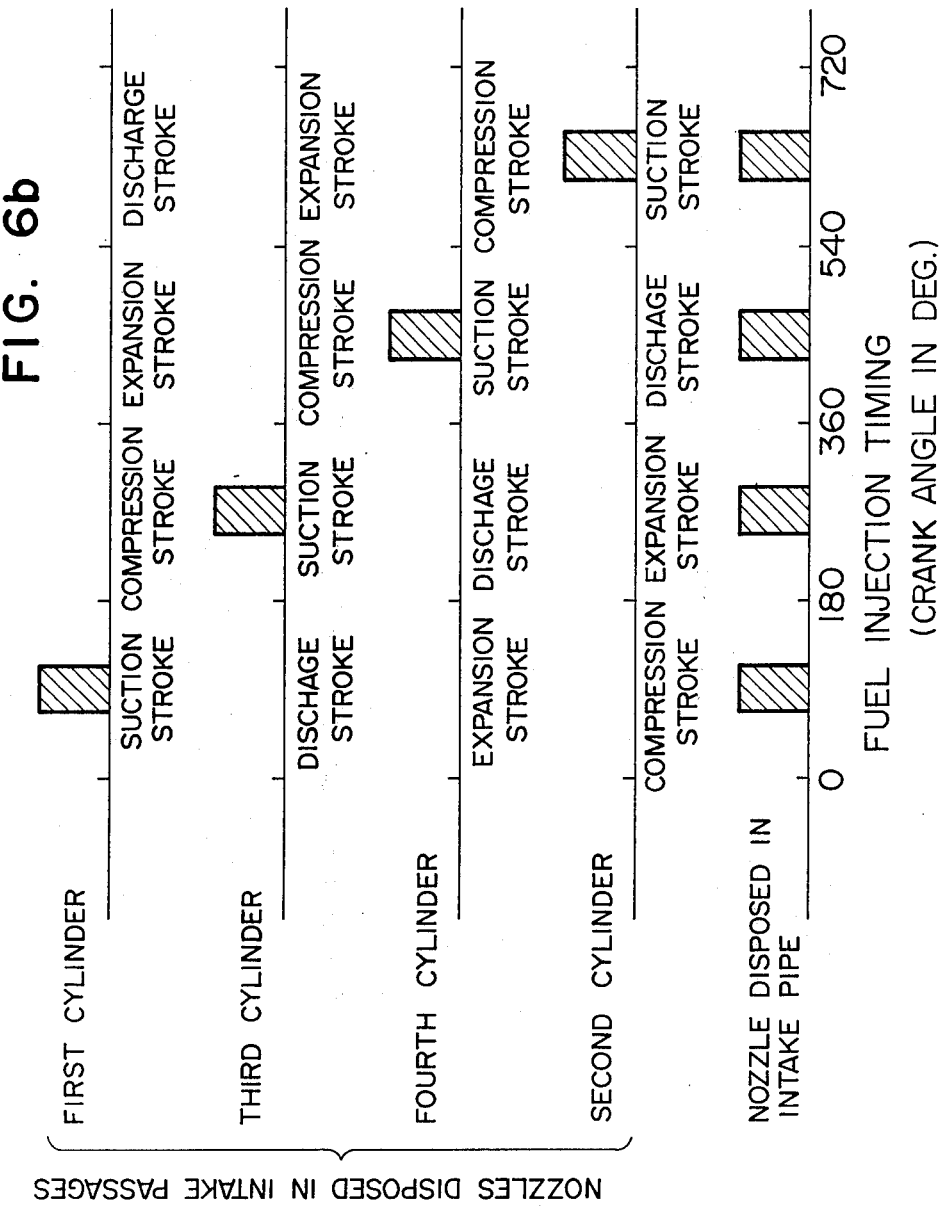

INTERNAL COMBUSTION ENGINE

The present invention relates to an internal combustion engine with a minimum pollutant emission, and more particularly a stratified combustion engine wherein the combustion of the lean mixture is started by the ignition of a rich mixture admitted only in the proximity of a spark plug, whereby the pollutant emission may be minimized.

There has been devised and demonstrated a stratified combustion engine for minimizing the pollutant emission of the type wherein a combustion chamber consists of a main combustion chamber and a trap chamber with a spark plug; and an intake system consists of means for delivering the lean mixture to the main combustion chamber and means for delivering the relatively rich mixture to the trap chamber, whereby the combustion of the lean mixture may be started by the ignition of the rich mixture in the trap chamber. In the internal combustion engines of the type described, a carburetor system or fuel injection system may be employed in order to deliver the relatively rich mixture. However, in general, the fuel injection system is more advantageous than the carburetor system in order to improve not only the uniform distribution of the rich mixture (fuel) into the cylinders of a multiple-cylinder engine but also the response of the engine to the transient operation such as acceleration or deceleration.

In the stratified combustion engines with the fuel injection system, a fuel injection nozzle is opened directly at the trap chamber or at a passage in communication with the trap chamber. This arrangement is very effective because the positive delivery of the fuel (rich mixture) to the trap chamber may be ensured whereby the satisfactory stratified combustion may be attained. However, it still has some disadvantages. When the fuel injection nozzle is directly opened at the trap chamber, its nozzle hole is directly exposed to the high temperature and high pressure combustion gases so that the injection nozzles must be made of a very expensive material capable of withstanding such high temperature and high pressure combustion gases. When the fuel injection nozzle is opened at the passage in communication with the trap chamber, this passage must be formed within the cylinder head and the suction valve for delivering the rich mixture must be placed within this passage. Therefore, the cylinder head is very complex in construction.

According to the present invention, in order to use inexpensive fuel injection nozzles and to attain effective stratified combustion without using a complex cylinder head complex in construction, the fuel injection nozzle is opened at the intake passage formed in the cylinder head, which passage is the lean mixture delivery means. In this arrangement, the mixture produced by the fuel injection through the injection nozzle is locally very rich, but the fuel is injected during the suction stroke in which the intake valve (at the intake port which is the lean mixture delivery means) is opened so that the positive trap of the rich mixture in the trap chamber may be ensured. In order to attain an effective stratified combustion, it is essential to inject the fuel during the suction stroke, but the vaporization of the fuel injection during the suction stroke is not satisfactory so that incomplete combustion occurs, thus resulting in an increase in pollutant emission. In some cases, the liquid particles of the injected fuel are charged into the trap chamber to wet the spark plug so that the mixture cannot be ignited. When the fuel is injected during a stroke other than the suction stroke; that is, during the time the intake valve is closed, there is a sufficient time before the injected fuel is admitted into the cylinder so that the fuel may be satisfactorily vaporized before ignited. However, the fuel injected into the intake manifold is diffused into the air (lean mixture) within the intake manifold so that the trap chamber cannot trap the sufficiently rich mixture.

As described above, the stratified combustion and the engine operation are greatly influenced by the fuel injection timing. FIGS. 1a and 1b show the results of the experiments conducted by the inventors. The experiments were conducted under the conditions that the rotational speed of the engine was 1,500 rpm; the intake pressure was −280 mm Hg; and the mean air-fuel ratio of the overall mixture consisting of the rich and lean mixtures was 18. FIG. 1a shows the relationship between the output torque and the fuel injection timing while FIG. 1b shows the relationship between the HC emission and the fuel injection timing. It is seen that when the fuel is injected during the suction stroke, a satisfactorily rich mixture is trapped in the trap chamber so that the maximum output torque may be produced (See FIG. 1a), but the HC emission also becomes maximum (FIG. 1b). Especially when the fuel is injected toward the end of the suction stroke, the time available for the vaporization of the injected fuel becomes shorter so that the HC emission is increased.

In view of the above, one of the objects of the present invention is to provide an internal combustion engine, wherein a first fuel injection nozzle is opened at an intake passage to each cylinder and a second fuel injection nozzle is opened upstream of the first fuel injection nozzle; and the first fuel injection nozzle injects the fuel during the suction stroke so that a stratified combustion may be accomplished and the engine efficiency may be much improved.

Another object of the present invention is to reform the fuel or at least improve the vaporization of the injected fuel by the provision of a spark plug located downstream of the second fuel injection nozzle and a flame extinguisher located downstream of the spark plug for cutting out the propagation of the flame.

A further object of the present invention is to provide an internal combustion engine wherein the second fuel injection nozzle is so positioned that the fuel may be injected against the direction of the air flowing through the throttle body or the intake manifold so that the satisfactory vaporization of the injected fuel may be attained.

When the engine is running at a high speed and/or under a high load, the speed of the air flowing through the throttle body, the intake manifold and the intake passage is increased and the temperature of the cylinder wall is also increased so that the vaporization of the injected fuel becomes very satisfactory. This means that even when the fuel is not injected through the second fuel injection nozzle when the engine is running at high speed and/or under a high load, the fuel in the rich mixture trapped in the trap chamber is satisfactorily vaporized before being ignited. Moreover, the engine response to transient operation and the uniform distribution of the mixture are adversely affected by the fuel injection through the second fuel injection nozzle. Therefore, a further object of the present invention is to provide an internal combustion engine, wherein the ratio between the injection quantities through the first and second fuel injection nozzles may be varied in response to the operating conditions of the engine so that the positive trap of the rich mixture in the trap chamber as well as the satisfactory vaporization of the fuel in the rich mixture before ignition may be ensured without adversely affecting the engine response to the transient operation and the uniform distribution of the mixture.

It is essential that the extra fuel injected for starting and/or during warming-up or operation in cold weather is completely vaporized before being ignited. Therefore, a further object of the present invention is to provide an internal combustion engine, wherein the extra fuel injection is accomplished by the second fuel injection nozzle so that smooth starting and warming-up or operation in cold weather may be ensured.

Briefly stated, the present invention provides an internal combustion engine including at least a main combustion chamber into which is admitted the lean mixture, an intake port of the main combustion chamber, an intake valve and intake valve seat at said intake port, an intake passage communicated through the intake port with the main combustion chamber mainly for charging the lean mixture into the main combustion chamber, an intake manifold in communication with the intake passage, a throttle body in communication with the intake mainfold, a trap chamber provided with a intake aperture through which the rich mixture is admitted therein when the intake valve is opened, thereby trapping the rich mixture therein, and a spark plug attached to the trap chamber, characterized by a fuel injection system comprising a first fuel injection nozzle whose nozzle hole is opened at the intake passage in such a way that the fuel injected through said nozzle hole during the suction stroke may be admitted through the intake port into the suction aperture of the trap chamber; a second fuel injection nozzle whose nozzle hole is opened at the throttle body or at the intake manifold; and a fuel injection control means for controlling the fuel injection through the first and second fuel injection nozzles in such a way that the first fuel injection nozzle injects the fuel during the suction stroke.

The invention will become more fully apparent from the following detailed description of the preferred embodiments thereof, the appended claims and the accompanying drawings in which:

FIGS. 6a and 6b are a diagrammatic view and a diagram used for the explanation of the first embodiment when applied to a four-cylinder engine;

DETAILED DESCRIPTION OF THE PREFERRED EMBODIMENTS

First Embodiment, FIGS. 2 – 6

Figure 2:
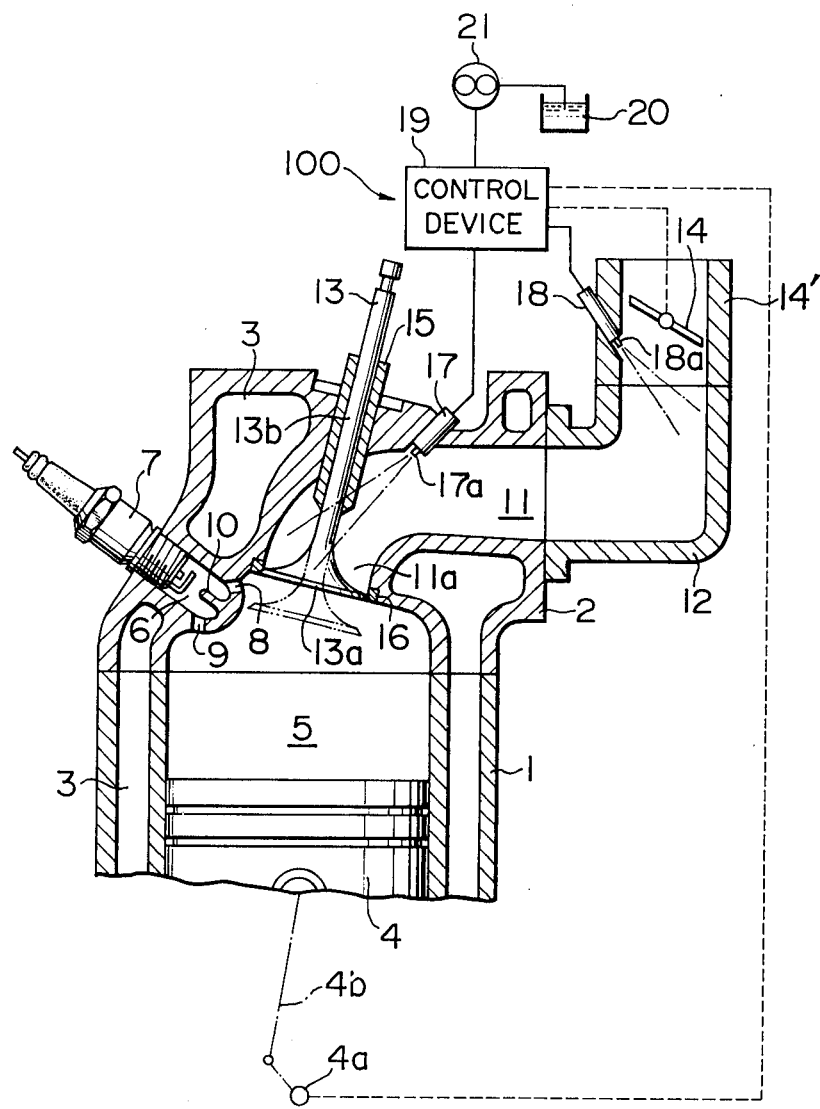
FIG. 2 is a fragmentary sectional view of a first embodiment of the present invention.

FIG. 2 is a fragmentary sectional view of an internal combustion engine in accordance with the present invention, wherein reference numerals 1, 2, and 3 denote a cylinder, a cylinder head and a water jacket, respectively. A main combustion chamber 5 is defined by the top of a piston 4 slidably fitted into the cylinder 1 for reciprocal movement, the wall of the cylinder 1 and the inner wall surface of the cylinder head 2. The lean mixture is admitted into the main combustion chamber 5 during the suction stroke of the engine. The piston 4 is connected through a connecting rod 4b to a crankshaft 4a so that the reciprocal motion of the piston 4 may be converted into the rotation of the crankshaft 4a. A trap chamber 6 is formed through the cylinder head 2, and a spark plug 7 is gas-tightly screwed into the trap chamber 6. The bottom portion of the trap chamber 6 is extended into the main combustion chamber 5 and is provided with an intake aperture 8 located close to an intake port 11a and a discharge aperture 9 located close to and directed to the top of the piston 4. A separating or partition wall 10 is extended outwardly from the inner bottom of the trap chamber 6 so that the space closer to the bottom may be divided into a first chamber in communication through the intake aperture 8 with the main combustion chamber 5 and a second chamber in communication through the discharge aperture 9 with the main combustion chamber 5.

The intake port 11a is located closer to the trap chamber 6, with which is communicated an intake passage 11 formed in the cylinder head 2. An intake manifold 12 is mounted on the cylinder head 2, and is communicated with the intake passage 11 at the downstream end thereof. A throttle body 14' mounted on the intake manifold 12 is communicated with the upstream end of the intake manifold 12, in which is disposed a throttle valve 14 operatively coupled to an accelerator pedal (not shown). Pressed against a valve seat 16 disposed around the intake port 11a is an intake valve 13 to close the intake port 11a. The intake valve 13 consists a valve head 13a and a valve stem 13b slidably fitted into a steam guide 15 and operatively coupled through a valve mechanism (not shown) to the crankshaft 4a in such a manner that the intake valve 13 makes one reciprocal motion while the crankshaft 4a makes two rotations. The configuration of the valve head 13a and the stroke of the intake valve 13 are so selected that when the valve head 13a is moved away from the valve seat 16 to its lowermost position, the left half periphery of the valve head 13a may be positioned in the proximity of the bottom of the trap chamber 6 as indicated by the broken lines in FIG. 2 for the reason to be described in detail hereinafter.

A fuel injection system generally indicated by 100 in FIG. 2 includes a first fuel injection nozzle 17 fitted into the cylinder head 2 in such a way that the fuel may be injected through a discharge port or hole 17a into the intake passage 11. More particularly, the first fuel injection nozzle 17 is so positioned and directed that the direction of the fuel injected may be substantially tangential to the air flow within the intake passage 11 directed toward the trap chamber 6. Therefore, the injected fuel may be carried by the air flow toward the trap chamber 6 as will be described in more detail hereinafter.

The fuel injection system 100 further includes a second fuel injection nozzle 18 attached to the throttle body 14' in such a way that the fuel may be injected through a discharge port or nozzle hole 18a into the downstream of the throttle valve 14.

The fuel injection system 100 includes a fuel injection control device 19 so that the fuel delivered thereto from a fuel tank 20 through a fuel pump 21 may be injected through the first and second fuel injection nozzles 17 and 18 in synchronism with the rotation of the crankshaft 4a as will be described in more detail hereinafter. In the first embodiment of the present invention, the fuel injection control device 19 is of the mechanical type for controlling the injection quantity depending upon the operating conditions of the engine.

Figure 3:
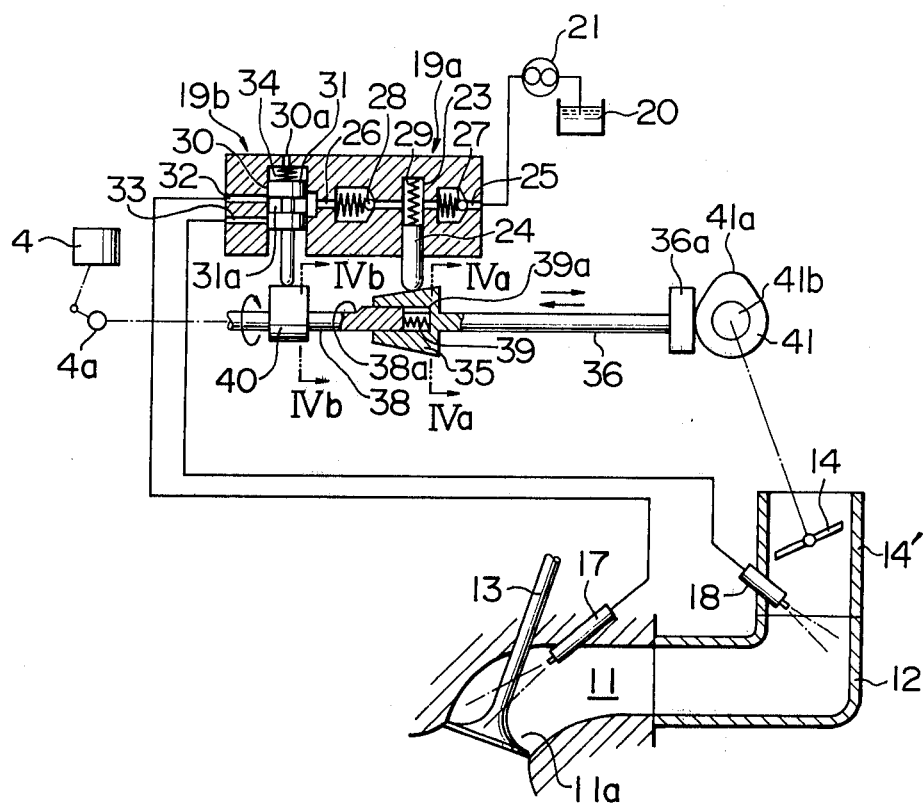
FIG. 3 is a diagrammatic view of a fuel injection system thereof.
Figure 4B:
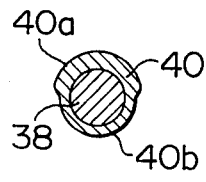
FIG. 4b is a sectional view taken along the line IVb — IVb of FIG. 3.

Next referring to FIGS. 3 and 4, the fuel injection control device 19 will be described in detail hereinafter. It includes a fuel injection pump 19a and a distributor 19b. The fuel injection pump 19a comprises a cylinder 23, a plunger 24 fitted into the cylinder 23, an inlet passage 25 and an outlet passage 26 both in communication with a chamber defined by the cylinder 23 and the plunger 24, an inlet valve 27 and an outlet valve 28 located within the inlet and outlet passages 25 and 26, respectively, and a spring 29 for downwardly biasing the plunger 24. The distributor 19b comprises a distribution cylinder 30, a distribution piston 31 slidably fitted into the cylinder 30, a first delivery passage 32 and a second delivery passage 33 which are alternately communicated with a distribution chamber 30, and a spring 34 for biasing the distribution plunger 31.

The inlet passage 25 of the fuel injection pump 19a is communicated through the fuel pump 21 with the fuel tank 20 while the outlet passage 26, with the distribution chamber 31a. The first and second delivery passages 32 and 33 are communicated with the first and second fuel injection nozzles 17 and 18, respectively. An orifice 30a is formed through the cylinder 30 in such a way that the chamber defined by the upper surface of the plunger 31 and the cylinder wall may be communicated with the surrounding atmosphere.

Figure 4A:
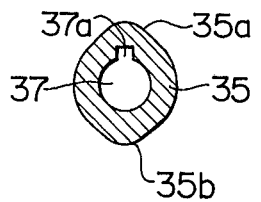
FIG. 4a is a sectional view taken along the line IVa — IVa of FIG. 3.

A solid cam 35 with two raised cam profile portions 35a and 35b (See FIG. 4) is made into contact with the lower end of the plunger 24 of the fuel injection pump 19a under the force of the spring 29. One end of the solid cam 35 is attached to one end of an actuating rod 36 while the other end is provided with an axial hole 37 with a groove 37a as best shown in FIG. 4a. One end of a driving shaft 38 is slidably fitted into the hole 37 with a key-shaped projection 38a at one end of the driving shaft 38 fitted into the groove 37a. Therefore, the driving shaft 38 may be not only rotated in unison with the solid cam 35, but also displaced in the axial direction of the solid cam 35. A spring 39 is interposed between the bottom of the hole 37 of the solid cam 35 and one end of the driving shaft 38.

A distribution cam 40, which is carried by the driving shaft 38 for rotation in unison therewith, has a raised cam profile portion 40a angularly spaced apart by 180° from a semicircular cam profile section 40b. The lower end of the distribution plunger 31 is made into contact with the distribution cam 40.

The driving shaft 38 is coupled through a suitable gear train (not shown) to the crankshaft 4a in such a way that the driving shaft 38 makes one rotation while the crankshaft 4a makes two rotations. A flange 36a formed at the other end of the actuating rod 36 is pressed under the force of the spring 39 against a control cam 41 with a raised cam profile section 41a so that when the control cam 41 rotates, the actuating rod 36 and hence the solid cam 35 are displaced relative to the lower end of the plunger 24 of the fuel injection pump 19a and over the driving shaft 38 which remains stationary in the axial direction as described hereinbefore. The cam shaft 41b of the control cam 41 is operatively coupled to the throttle valve 14 so that the control cam 41 may be rotated in unison with the throttle valve 14.

Next the mode of the operation of the fuel injection control device 19 with the above construction will be described. The rotation of the crankshaft 4a is transmitted through the gear train (not shown) and the driving shaft 38 to the solid cam 35 and the distribution cam 40. The rotation of the solid cam 35 causes the reciprocal movement of the plunger 24 so that the fuel delivered from the fuel tank to the fuel injection pump 19a is forced into the distribution chamber of the distributor 19b. The fuel is injected twice for every two rotations of the crankshaft 4a; that is, for each cycle of the engine. The rotation of the distribution cam 40 causes the reciprocal movement of the distribution plunger 31 so that the fuel may be delivered through the first delivery passage 32 to the first fuel injection nozzle 17 one time for each cycle of the engine and also delivered through the second fuel delivery passage 33 to the second fuel injection nozzle 18 once for each cycle of the engine. During the suction stroke, the raised cam profile section 35a of the solid cam 35 moves the plunger 24 upwardly in FIG. 3 so that the fuel under pressure is forced into the distribution chamber 31a while the raised cam profile section 40a of the distribution cam 40 also displaces the plunger 31 upwardly so that the distribution chamber may be communicated with the first delivery passage 32. Therefore, the fuel is injected through the first injection nozzle 17 into the intake passage 11 during the suction stroke. The fuel is also injected into the throttle chamber 12 through the second fuel injection nozzle 18 during the expansion stroke; that is, after the solid cam 39 has rotated through 180° (the crank angle of 360°) from the time when the fuel was injected through the first fuel injection nozzle 17.

The quantity of the pressurized fuel to be delivered to the first and second fuel injection nozzles 17 and 18 may be varied because when the throttle valve 14 is opened or closed, the control cam 41 is rotated to displace the solid cam 35 relative to the plunger 24 in the axial direction of the cam 35. The quantities of the fuel to be delivered to the first and second fuel injection nozzles 17 and 18 as well as the ratio therebetween may be optimumly controlled by selecting the suitable cam profile of the solid cam 35.

In the instant embodiment, the minimum quantity of the fuel required for producing the rich mixture to be charged into the trap chamber 6 is discharged through the first fuel injection nozzle 17 while the remaining fuel required for each cycle of the engine is injected into the throttle body 14' through the second fuel injection nozzle 18 in order to facilitate the satisfactory vaporization of the fuel. The ratio of the fuel quantity injected through the first injection nozzle 17 to the fuel quantity injected through the second fuel injection nozzle 18 may be increased as the opening of the throttle valve 14 is increased, because, in general, the satisfactory vaporization of the fuel may be facilitated at a high load and high speed operating condition of the engine with the intake air quantity increased and with the temperature of the combustion chamber considerably raised.

Figure 5:
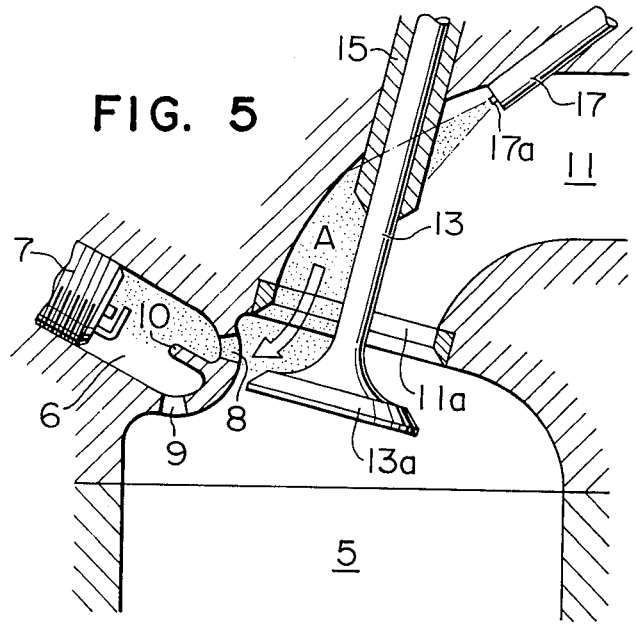
FIG. 5 is a fragmentary sectional view, on enlarged scale, used for the explanation of the mode of operation during the suction stroke of the first embodiment.

Next the mode of operation during the suction stroke will be described in more detail with particular reference to FIG. 5. The satisfactory vaporization of the fuel injected through the second fuel injection nozzle 18 into the throttle body 14' can be attained because there is a sufficient time before the injected fuel is admitted into the cylinder. In general, the lean mixture flowing from the throttle body 14' may be divided in the intake passage 11 into a first flow which is so directed as to flow through the intake port 11a and the suction aperture 8 into the trap chamber 6 and a second flow which is directly admitted into the main combustion chamber 5. Therefore, the fuel injected through the first injection nozzle 17 is carried by the first flow of the lean mixture into the trap chamber 6 as indicated by the arrow A. The valve head 13a serves to redirect the fuel injected through the first fuel injection nozzle 17 toward the suction aperture 8 of the trap chamber 6. The remaining gases in the trap chamber 6 are discharged into the main combustion chamber 5 through the discharge aperture 9. The separating or partition wall 10 in the trap chamber 6 not only prevents the fuel admitted into the trap member 6 through the suction aperture 8 from being directly discharged through the discharge aperture 9 into the main combustion chamber 5 but also improves the scavenging of the trap chamber 6.

Figure 1A:
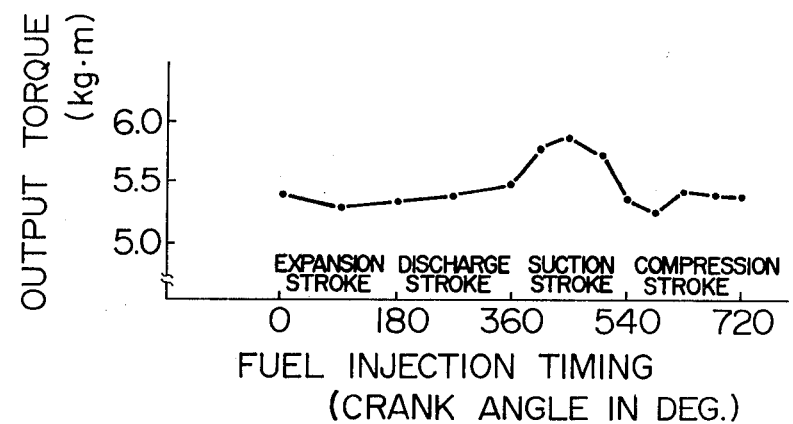
FIG. 1a is a diagram showing the relationship between the fuel injection timing and the output torque in a conventional internal combustion engine.
Figure 1B:
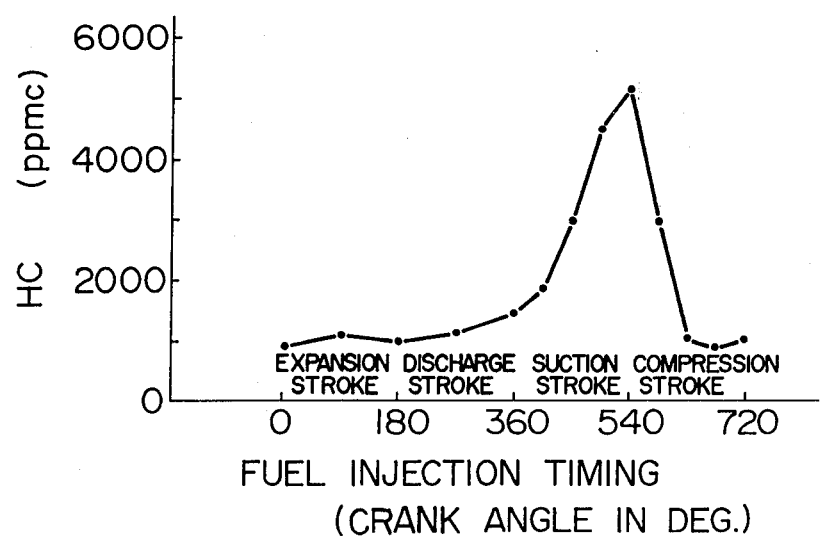
FIG. 1b is a diagram similar to FIG. 1a but illustrates the relationship between the fuel injection timing and the HC emission.

Thus, the rich mixture layer can be formed within the trap chamber 6 and the lean mixture, in which the fuel is very satisfactorily atomized and vaporized, is charged into the main combustion chamber 5. Therefore not only the ignition lag and misfiring may be prevented but also the quantity of HC discharged may be minimized. According to the present invention, the quantity of HC emission may be reduced almost one half compared with the case in which the fuel is injected into the intake manifold 11 only through the first fuel injection nozzle 17 during the suction stroke (the HC emission being shown in FIG. 1b).

Figure 6A:
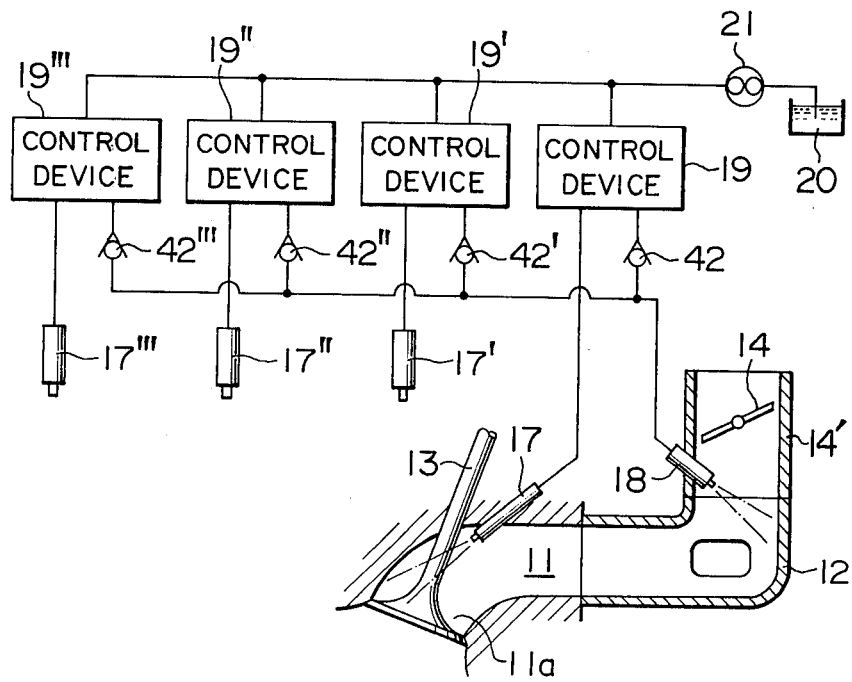

So far the present invention has been discribed in conjunction with the single cylinder engine, but it may be applied also to the multiple-cylinder engines when the fuel injection system is arranged as shown in FIG. 6a and the fuel injection is carried out with the fuel injection timing shown in FIG. 6b. In case of, for instance, a four cylinder engine, four fuel injection control devices 19, 19', 19" and 19''' are provided for four cylinders, respectively, and during the suction of each stroke of each cylinder the fuel is injected through the fuel injection nozzle 17, 17', 17" or 17''' into the intake passage 11 in the proximity of the intake port 11a. The second fuel injection nozzle 18, which injects the fuel into the throttle body 14', is communicated through check valves 42, 42', 42" and 42''' with the fuel injection control devices 19 through 19'''. The fuel injection through the second injection nozzle 18 is lagged behind the fuel injection through the first fuel injection nozzle 17, 17', 17" or 17''' by 360° in crank angle so that the fuel is injected as shown in FIG. 6b.

FIRST VARIATION OF FIRST EMBODIMENT, FIG. 7

Figure 7:
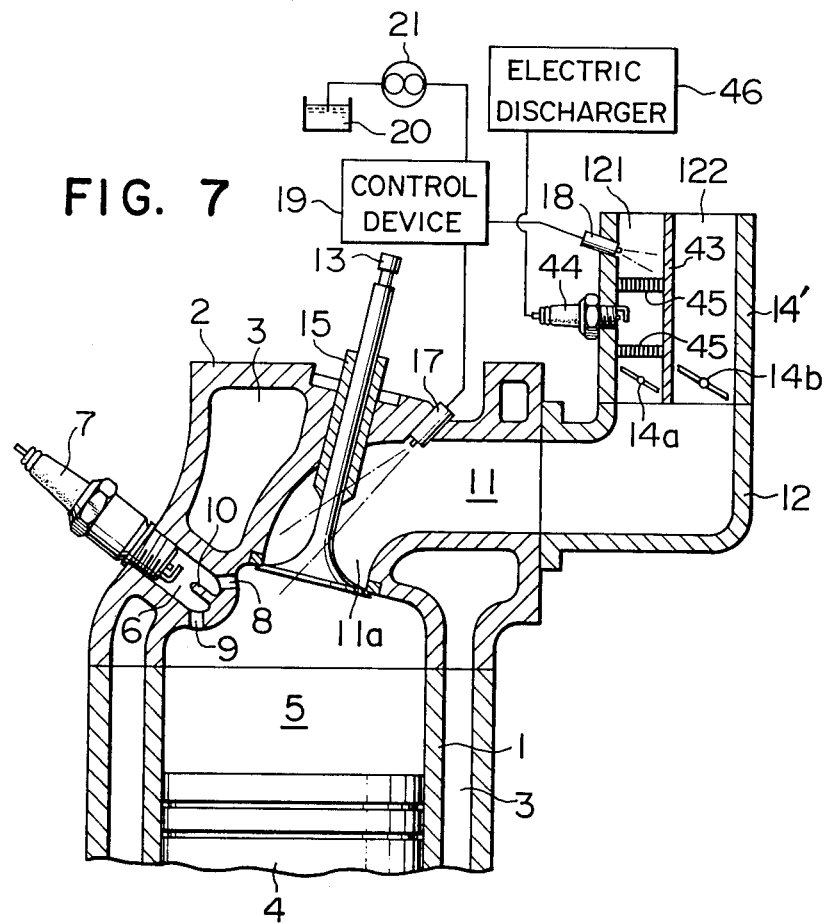
FIg. 7 is a fragmentary sectional view of a first variation of the first embodiment shown in FIG. 2.

The first variation of the first embodiment of the present invention will be described with reference to FIG. 7 in which the same reference numerals used in the description of the first embodiment are also used to designate similar parts. In the instant variation, the throttle body 14' is divided by a partition wall 43 into a first passage 121 and a second passage 122 in which are disposed the throttle valves 14a and 14b, respectively. Within the first passage 121 are placed two vertically spaced apart flame extinguishers 45, and a spark plug 44 is attached between them while the second fuel injection nozzle 18 is attached above the upper flame extinguisher 45. The throttle valve 14a is located below the lower flame extinguisher 45. The fuel injection system substantially similar to that of the first embodiment is used in the first variation.

Figure 8:
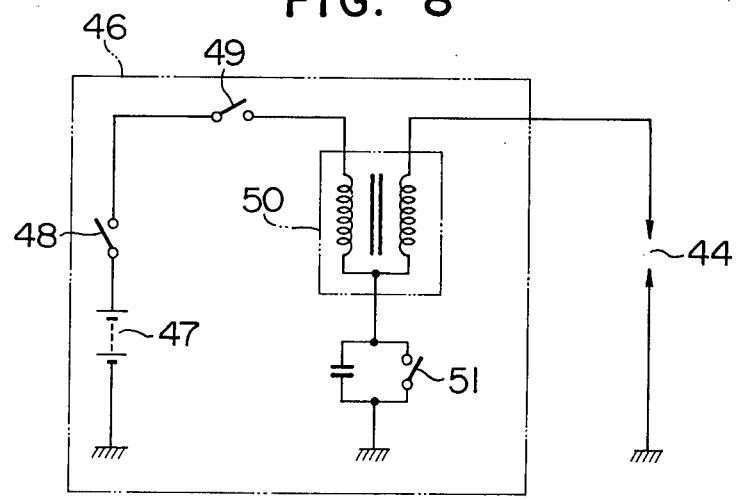
FIG. 8 is a diagram of an electrical circuit thereof.

The spark plug 44 is connected to a discharge circuit 46 which comprises, as shown in FIG. 8, a power supply 47, a key switch 48, a switch 49, an ignition coil 50 and a contact breaker 51. The sectional area of the first passage 121 is selected so that the ratio of the quantity of air flowing therethrough to the quantity of fuel injected through the second injection nozzle 18 may be small in order to produce the sufficiently rich mixture.

When the fuel is injected into the first passage 121 through the fuel injection nozzle 18, the discharge circuit 46 energizes the spark plug 44 to cause the combustion within the first passage 121. Since the ignited mixture is rich, the combustion within the first passage 121 is incomplete so that when the fuel is gasoline, large amounts of hydrogen and carbon monoxide are produced and admitted into the main combustion chamber 5 and the trap chamber 6. Therefore, the emission of unburned gases may be prevented. Even when the gasoline fuel is not completely converted or reformed into hydrogen and carbon monoxide, the satisfactory atomization and vaporization of the fuel may be ensured by the combustion energies liberated by the spark generated by the ignition plug 44.

Figure 9:
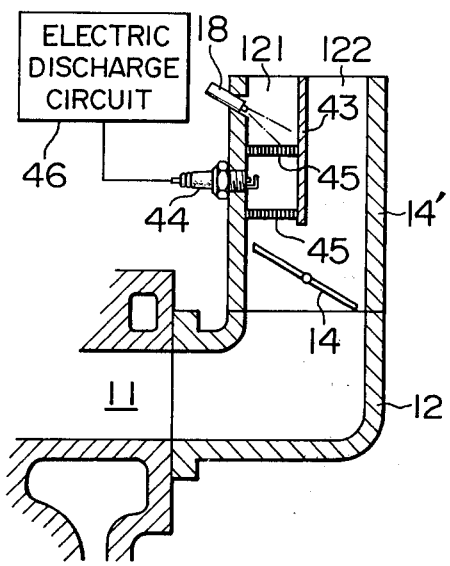
FIGS. 9 and 10 are sectional views of second and third variations of the first embodiment, respectively.
Figure 10:
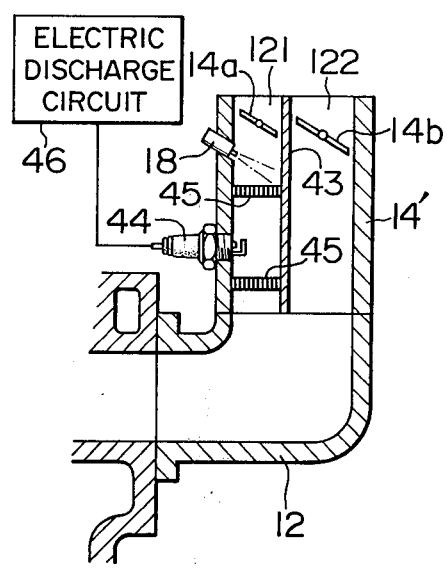

Second and Third Variations of First Embodiment, FIGS. 9 and 10

In the second variation shown in FIG. 9, only one throttle valve 14 is provided in the throttle body 14' which is divided above the throttle valve 14 into the first and second passages 121 and 122 by the partition wall 43. The spark plug 44 is attached between the upper and lower flame extinguishers 45 while the second fuel injection nozzle 18 is attached above the upper flame extinguisher 45.

The third variation is substantially similar in construction to the first variation except that the throttle valves 14a and 14b are located in the first and second passages 121 and 122, respectively, in the proximity of their inlets.

The construction of the above three variations may be summarized as follows. The ignition plug 44, which intermittently produces the sparks, is located below or in the downstream of the second fuel injection nozzle 18, and at least one flame extinguisher 45 is located below or in the downstream of the ignition plug 44 so that the fuel injected through the second injection nozzle 18 may be converted or reformed into hydrogen and carbon monoxide or at least may be satisfactorily atomized and vaporized.

Figure 11:
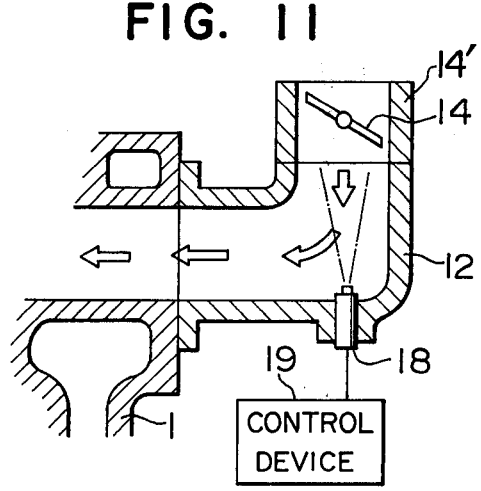
FIGS. 11 and 12 are sectional views of fourth and a fifth variations of the first embodiment.

Fourth Variation of First Embodiment, FIG. 11

The fourth variation of the first embodiment is substantially similar in construction to the first embodiment except that the second fuel injection nozzle is located at the bend of the intake manifold 12 so that the fuel may be injected against the intake air flow. The distinct advantage of the fourth variation resides in the fact that the speed of the atomized fuel particles relative to the intake air flow and the distance of the travel of the atomized particles may be increased. That is, the distance from the discharge port of the injection nozzle 18 to the main combustion chamber 5 and the trap chamber 6 may be increased so that the more satisfactory vaporization of injected fuel and mixing with the intake air may be attained. Therefore, the complete combustion in both the main combustion chamber 5 and the trap chamber 6 may be ensured.

Figure 12:
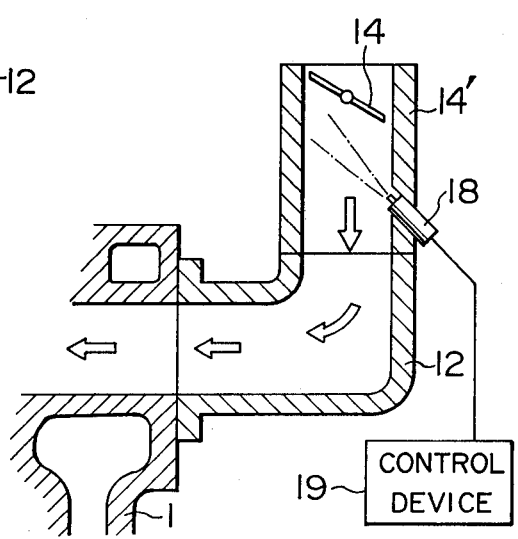

Fifth Variation, FIG. 12

The fifth variation shown in FIG. 12 is also substantially similar in construction to the first embodiment except that the second fuel injection nozzle 18 is attached at an angle to the throttle body 14' so that the fuel may be injected also against the intake air flow. The fifth variation may also attain the advantage similar to that of the fourth variation described above.

Second Embodiment, FIGS. 15 through 20

When the engine is running at a high speed, the velocity of the intake air flowing through the throttle body, the intake manifold and the intake passage becomes faster so that the vaporization of the fuel may be much facilitated. In like manner, when the engine is running under a heavy load, the temperature of the cylinder wall in the combustion chamber is high so that the vaporization of the charged fuel may be also facilitated. This means that when the engine is running at a high speed and/or under a heavy load, the rich mixture, in which the fuel has been satisfactorily vaporized, may be trapped in the trap chamber even without the aid of the fuel injection through the second fuel injection nozzle opened into the throttle body or the intake manifold. Furthermore, the second fuel injection nozzle is, in general, disadvantageous from the standpoint of the engine response during the transistion period and in view of the uniform distribution of the fuel to all cylinders. In order to overcome these disadvantages, according to the second embodiment of the present invention, the ratio of the injection quantity through the first fuel injection nozzle disposed in the proximity of the intake port to the injection quantity through the second fuel injection nozzle opened at the throttle body may be varied depending upon the operating conditions of the engine so that the positive trap of the rich mixture in the trap chamber and the satisfactory vaporization of the fuel in the rich mixture may be ensured.

Figure 13:
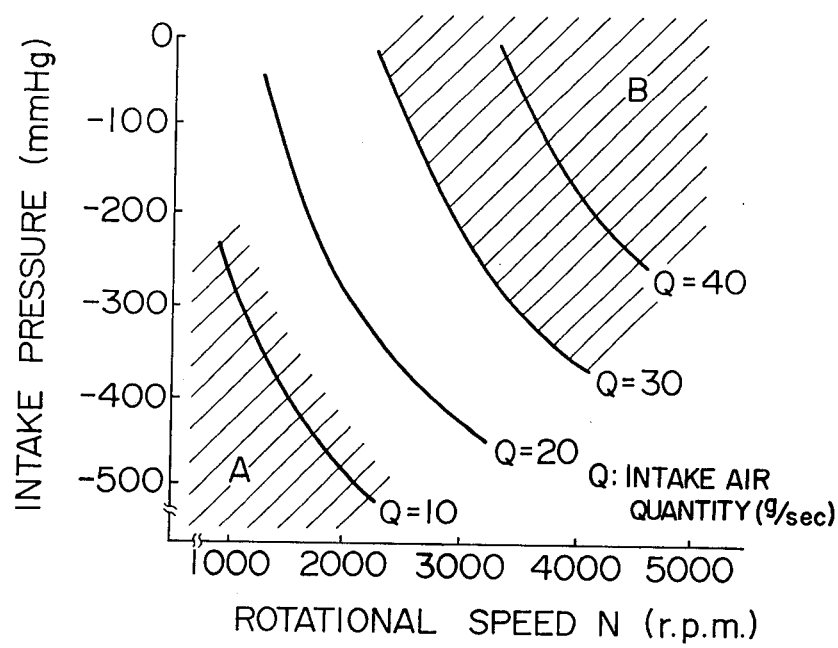
FIG. 13 is a diagram used for the explanation of the second embodiment of the present invention.
Figure 14:
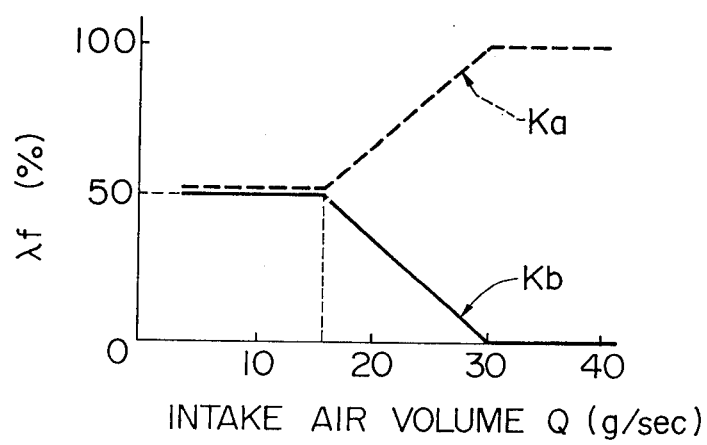
FIG. 14 is a diagram used for the explanation of the fuel injection quantity ratio changing means of the second embodiment.

As described above, according to the present invention, the ratio between the injection quantities through the first and second injection nozzles is varied depending upon the operating conditions of the engine, more particularly depending upon the intake air quantity which is a parameter of the operating conditions of the engine, changing depending upon the rotational speed and load of the engine. The underlying principle of the second embodiment will be described in more detail with particular reference to FIGS. 13 and 14. Assume that the vaporization of the injected fuel be not sufficient in the region A where intake air quantity Q is less than 15 while the satisfactory vaporization may be attained in the region B where the intake air quantity is higher than 30 as shown in FIG. 13. According to the second embodiment, the ratio of the injection quantities through the first and second injection nozzles is varied, for instance, as shown in FIG. 14, in which plotted along the coordinate is the ratio $\lambda f(\%)$ of the injection quantity through the first or second injection nozzle to the total injection quantity for each cycle of the engine; that is, the sum of the fuel injection quantities through the first and second injection nozzles during each cycle. The broken curve indicates the ratio of the injection quantity through the first injection nozzle while the solid line curves, the ratio of the injection quantity through the second nozzle.

Figure 15:
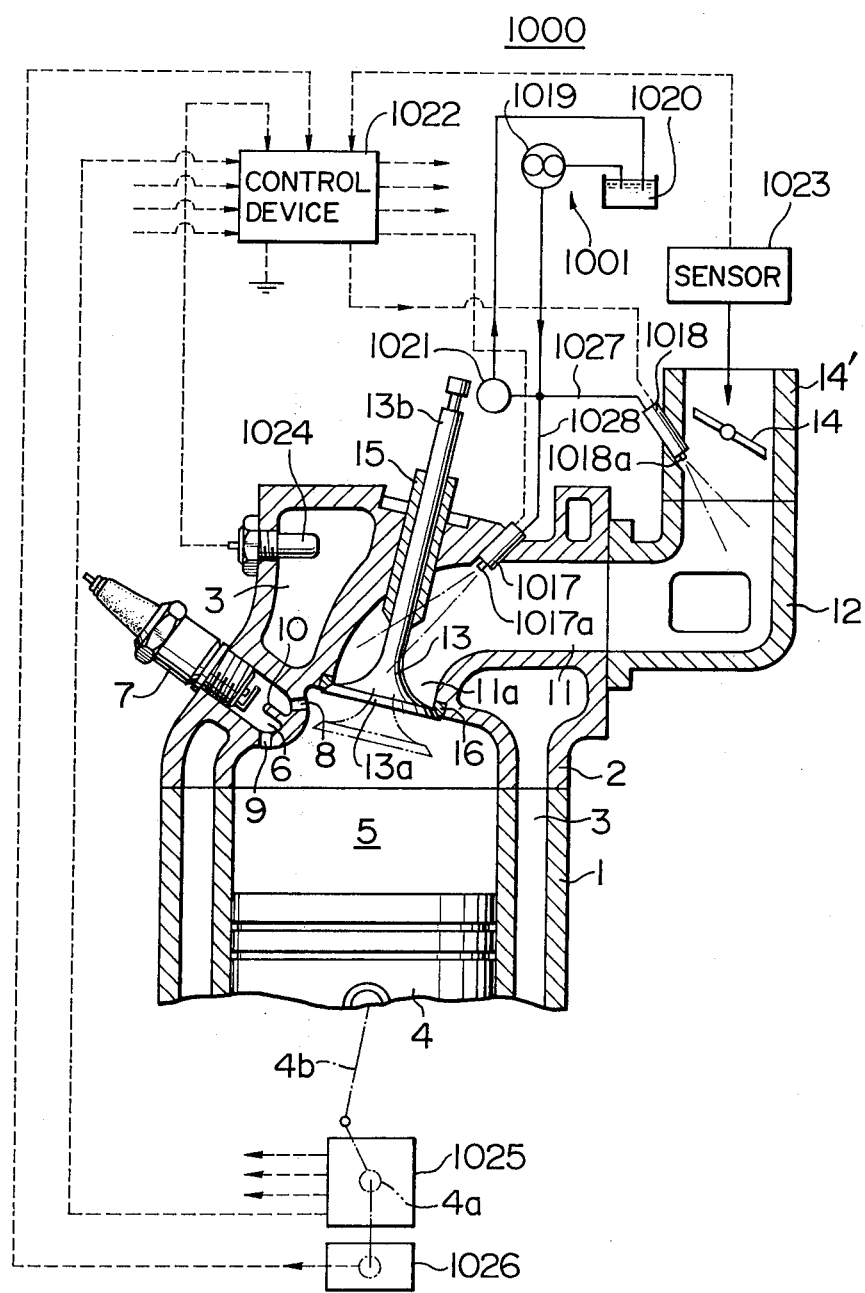
FIG. 15 is a fragmentary sectional view of the internal combustion engine incorporating the second embodiment of the present invention.

Referring next to FIG. 15, the same reference numerals used in the first embodiment are also used in the second embodiment to designate similar parts. In the second embodiment, an electronically controlled fuel injection system 1000 is employed, and includes a first solenoid operated fuel injection nozzle 1017 for injecting the fuel into the intake passage 11 in the proximity of the intake port 11a and a second solenoid controlled fuel injection nozzle 1018 for injecting the fuel into the throttle body 14'. Both the first and second injection nozzles 1017 and 1018 are located and directed in a manner substantially similar to that described in the first embodiment.

The fuel injection system 1000 includes a fuel injection control system which in turn comprises a fuel supply device 1001 for delivering the pressurized fuel to the first and second nozzles 1017 and 1018, and an injection timing control device 1022 for controlling the injection timing as well as the injection period of the first and second injection nozzles in response to the electrical signals from a sensor system for detecting the operating conditions of the engine. The injection quantity through the first or second injection nozzle is dependent upon the injection period.

The injection timing control device 1022 further includes an injection quantity ratio changing device 1200 for changing the ratio between the injection quantities through the first and second injection nozzles 1017 and 1018 in response to the intake air quantity.

The sensor system comprises a first sensor 1023 well known in the art for generating the electrical signal representative of the intake air quantity, a second sensor 1024 positioned in the water jacket 3 for generating the electrical signal representative of the temperature of the cooling water, a synchronizing signal generator 1025 operatively coupled to the crankshaft 4a for generating the synchronizing signals in synchronism with the rotation thereof and a third sensor or tachometer 1026 for generating the electrical signal representative of or in proportion to the rotational speed of the engine.

A fuel supply device 1001 comprises a fuel tank 1020, a fuel pump 1019 for delivering the fuel from the tank 1020 to the first and second injection nozzles 1017 and 1018 through fuel pipes 1027 and 1028, respectively, and a pressure regulator 1021 for maintaining constant the pressure of the fuel delivered to the first and second injection nozzles 1017 and 1018 (in general, 2 to 3 atm.)

Figure 16:
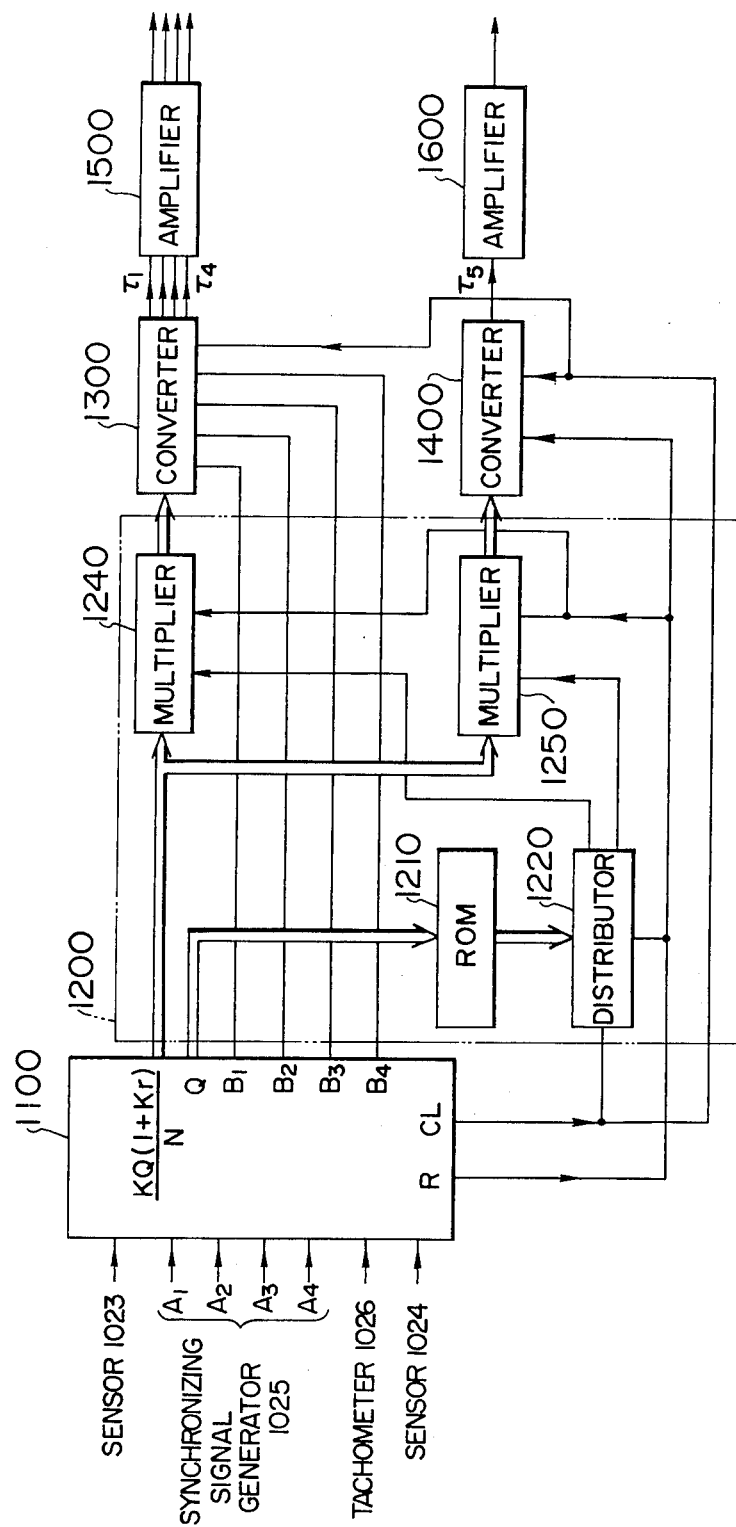
FIG. 16 is a block diagram of a fuel injection control device thereof.

The detail of the control device 1022 is shown in FIG. 16 in which a control circuit 1100 receives the output electrical signals from the first or air intake quantity sensor 1023, the synchronizing signals A1, A2, A3 and A4 from the synchronizing signal generator 1025 which are generated for every 1/2 rotation of the crankshaft 4a; the output signal from the tachometer 1026, and the output signal from the cooling water temperature sensor 1024. The control circuit 1100 shapes and calculates these output signals to produce the output signal $KQ(1 + KT)/N$, the output signal Q, the synchronizing signals B1, B2, B3 and B4, the clock signal CL and the reset signal R, where Q: intake air quantity;
N: rotational speed of the engine;
K: proportionality constant use for determining the air-fuel ratio (A/F); that is, the relationship between the intake air quantity Q and the fuel injection period; and
KT: proportionality constant depending upon the temperature of the cooling water.

The output signals $KQ(1 + KT)$ and Q are represented in binary code.

The injection ratio changing device generally indicated by the reference numeral 1200 comprises a read-only memory 1210 adapted to produce, in response to the output signal Q from the control circuit 1100, the output signal representing the broken-line characteristic curve shown in FIG. 14 according to a predetermined program; a distribution circuit 1220 for distributing in response to the output signal from the read-only memory 1210 and the clock signal and the reset signal R from the control circuit 1100, the clock signals CL into a first group consisting of a number of $n_1$ clock pulses CL and a second group consisting of a number of $n_2$ clock pulses; and a first multiplier 1240 and a second multiplier 1250 for producing, in response to the output signal $KQ(1 + KT)/N$ from the control circuit 1100 and the clock pulses $n_1$ and $n_2$ from the distributor 1220, the first output signal $$\frac{KQ(1 + KT)}{N} \cdot \frac{n_1}{n_1 + n_2}$$

and the second output signal $$\frac{KQ(1 + KT)}{N} \cdot \frac{n_2}{n_1 + n_2},$$

respectively. The outputs from the first and second multipliers 1240 and 1250 are applied to a first converter 1300 and to a second converter 1400, respectively, which generate the pulse output signals with the pulse widths representative of the binary coded output signals from the first and second multipliers 1240 and 1250, respectively. The outputs from the first and second converters 1300 and 1400 are applied to a first power amplifier 1500 and a second power amplifier 1600, respectively. In FIG. 16, the double lines indicate the binary-coded signals, while the signal lines indicate generally the signals transmitted in series. Accordingly, each line does not mean a lead wire.

Next referring to FIGS. 17a, 17b and 20, the construction and mode of operation of the control circuit 1100, the synchronizing signal generator 1025, the tachometer 1026 and the intake air quantity sensor 1023 will be described.

Figure 20:
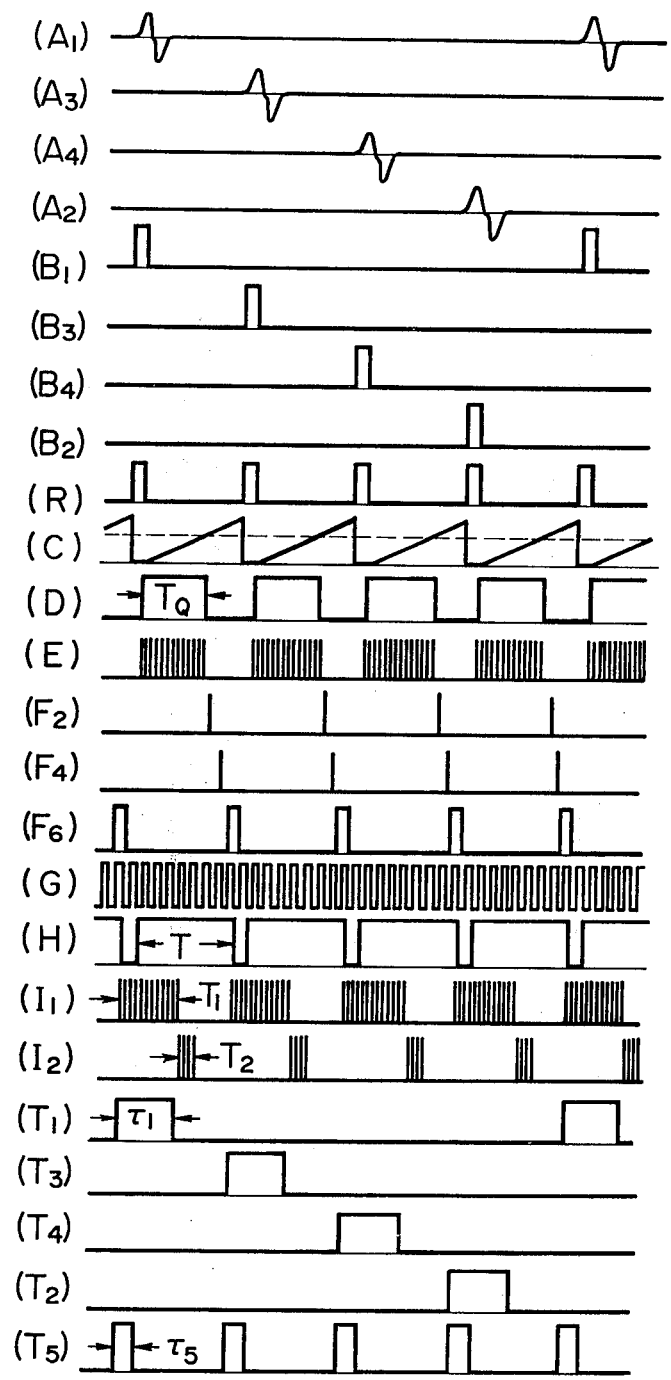
FIG. 20 shows the various signal waveforms used for the explanation of the mode of operation of the control system of the second embodiment.

Even though the detailed construction of the synchronizing signal generator 1025 is not shown, it may comprise a permanent magnet mounted upon a rotor of a distributor which makes one rotation while the crankshaft 4a makes two rotations (and distributes the high voltage to the spark plug 7), and four cores with windings equiangularly spaced apart around the rotor so that the synchronizing signals are generated for every ½ rotation of the crankshaft 4a as indicated (A1), (A2), (A3) and (A4) in FIG. 20. These synchronizing signals are in synchronism with the suction strokes of the first, second, third and fourth cylinders, respectively.

A shaping circuit 1110 comprises four trigger pulse generating circuits 1110a, 1110b, 1110c and 1110d and an OR gate 1111. The trigger pulse generating circuit 1110a comprises a DC amplifier 1112 (for instance, an Integrated Circuit, MC 3302p, the product of Motolora Corp.), a buffer circuit 1113, a resistor 1114, a capacitor 1115, an inverter 1116 and a NOR gate 1117. The remaining three trigger pulse generating circuits 1110b, 1110c, and 1110d are similar in construction to the circuit 1110a.

A shaping circuit 1110 produces the synchronizing signals B1, B2, B3 and B4 indicated at (B1), (B2), (B3) and (B4) in FIG. 20 and the reset signal R indicated at (R) in FIG. 20.

The detailed construction of an oscillator 1120 is not shown, but it may be of the conventional crystal-controlled type for producing plural groups of the clock pulses each of which has a predetermined frequency, for example one of which has a frequency dependent upon the constant K or the air-fuel ratio (A/F). In the figure, although one lead wire for feeding clock pulses to each circuit, described hereinafter, of the oscillator 1120 is shown, in fact the lead wire is provided for each circuit.

The D-A converter 1130 comprises a 8-bit binary counter 1131 and a ladder network consisting of resistors R1 and R2. Each time when the binary counter 1131 is reset in response to the reset signal R from the shaping circuit 1110, it starts counting the clock pulses from the oscillator 1120. Therefore, the sawtooth waveform voltage as indicated at (C) in FIG. 20 appears at the output terminal C of the D-A converter 1130. The gradient or rise time of the sawtooth waveform output voltage represents the air-fuel ratio A/F.

A comparator system 1140 comprises a comparator 1141, a R-S flip-flop 1142 and a NOR gate 1143. The comparator compares the output (FIG. 20(C)) from the D-A converter 1130 with the output voltage signal (indicated by the broken lines in FIG. 20(C)). When the output voltage (C) exceeds the output voltage from the intake air quantity sensor 1023 representing the intake air quantity Q, the comparator 1141 generates the output 1, in response to which the R-S flip-flop 1142 is set. Therefore, the pulse signal (See FIG. 20(D)) appears at the output terminal D of the NOR gate 1143 to which are applied the Q output signal from the flip-flop 1142 and the reset signal R. The pulse duration of the output pulse signal (D) is in proportion of the intake air quantity Q. Thus the comparator system 1140 acomplishes the multiplication of the intake air quantity Q by the constant K.

A summing circuit 1150 comprises a parallel adder 1151 (for instance IC, CD 4008, the product of RCA Corp.). Its binary coded input X10X9 . . . X1 represents the constant 1.00 while its binary coded input Y10Y9 . . . Y1, the temperature of the cooling water. Its binary coded output Z10Z9 . . . Z1 represents the sum (X10X9 . . . X1 + Y10Y9 . . . Y1). For instance, when the constant KT which represents the temperature of the cooling water, is 0.2, the first input or constant 1 is 0001100100 while the second input or KT = 0.2,0000010100. In order to change the binary coded water temperature compensation constant KT in response to the variation in temperature of the cooling water, an integrated circuit such as an IC, DC 4046, the product of RCA Corp. may be used for converting the voltage signal into the frequency signal.

A first multipler circuit 1160 comprises a parallel adder 1161 (for instance, IC, CD 4008, the product of RCA Corp.), a first memory 1162 (for instance, IC, DC 4035, the product of RCA Corp.), a second memory 1163 (for instance, IC, DC 4042, the product of RCA Corp.), an AND gate 1164, and a counter with a decimal divider 1165 (for instance, IC, CD 4017, the product of RCA Corp.). The output L18 . . . L1 from the first memory 1162 is applied as an input J18J17 . . . J1 to the adder 1161. The counter 1165 is so arranged that when six pulses have been received, it stops counting. When the output pulse signal with the pulse duration TQ from the comparator system 1140 is 1 as indicated at (D) in FIG. 20, the number of n of the clock pulses from the oscillator 1120 pass through the AND gate 1164 and appear at the output terminal E thereof as indicated at (E) in FIG. 20. The number of n clock pulses is in proportion to the pulse duration TQ of the output pulse signal from the comparator system 1140. When the output signal from the comparator system 1140 changes to 0, the clock pulses are countered by the counter 1165. When the counter 1165 counts the second, fourth and sixth clock pulses, the outputs 1 appears at its output terminals F2, F4 and F6 as indicated at (F2), (F4) and (F6), respectively, in FIG. 20. When the counter 1165 counts the fourth clock pulse, the output L18 . . . L1 changes to 0 so that the first memory 1162 is reset. Thereafter, each time when the clock pulses pass through the AND gate 1164 as indicated at (E) in FIG. 20, the output L18 . . . L1 of the first memory 162 changes as follows:

$$Z10 \ldots Z1,$$
$$2 \times Z10 \ldots Z1,$$
$$\ldots$$
$$n \times Z10 \ldots Z1.$$

In response to the clock signal indicated at (F2) in FIG. 20, the upper ten digits from the most significant digit of the output $n \times Z10 \ldots Z1$ are latched in the memory 1162 as the output M10 . . . M1. The number n of the clock pulses is in proportion to the intake air quantity Q while the output Z10 . . . Z1 is a binary code representative of (1.00 + KT) so that the first multiplier 1160 generates the product in binary code KQ (1.00 + KT).

The detailed construction of the tachometer 1026 is not shown, but it is of the type consisting of, for instance, a ring gear and an electromagnetic pickup so that 115 pulse signals may be generated for every two rotations of the crankshaft 4a. Therefore, the pulse duration is in proportion to the rotational speed of the engine.

A frequency divider 1170 comprises a DC amplifier 1171 (for instance, IC, MC 3302P, the product of Motolora Corp.), a binary counter 1172, an AND gate 1173 and an inverter 1173. The output signal from the tachometer 1026 is amplified and shaped into the pulse signals as indicated at (G) in FIG. 20. These pulse signals are divided in frequency by factors 2, 4, 8 and 16 by the counter 1172. As soon as the frequency division by a factor 16 is started, the output signal 1 appears at the AND gate 1173 so that the counter 1172 is reset. Consequently, the output pulse signals with the pulse duration T appear at the output terminal H of the inverter 1174 as indicated at (H) in FIG. 20. The pulse duration T equals 8 pulses signals shown at (G) in FIG. 20, and is in proportion to the reciprocal 1/N of the rotational speed N of the engine.

A second multiplier 1180 is substantially similar in construction to the first multiplier 1160. While the first multiplier 1160 is connected to the oscillator 1120, the comparator system 1140 and the summing circuit 1150, the second multiplier 1180, to the frequency divider 1170, the oscillator 1120 and the first multiplier 1160. During the pulse duration T of the output pulse signals from the frequency divider 1170 (See FIG. 20 (H)), the output M10 . . . M1 from the first multiplier 1160 is added $n'$ times, $n'$ representing the number of times of the clock pulses generated by the oscillator 1120 during the above pulse duration T, so that the output of the second multiplier 1180 becomes $$n' \times M10 \ldots M1$$

which is represented by

N10 ... N1.

In summary, the second multiplier 1180 executes the operation of KQ(1 + KT)/N, the output being in the form of a binary coded signal.

A binary converter 1190 comprises a binary counter 1191 and a memory 1192. As soon as the binary counter 1165 in the first multiplier 1160 counts the fourth clock pulse, the binary counter 1191 is reset to start counting the clock pulses passing through the AND gate 1164. When the binary counter 1165 counts the second pulse after it has been reset. Thus, the output of the memory 1192 is a binary coded signal P8 ... P1 representative of the intake air quantity Q.

Thus, the control circuit 1100 generates the output KQ(1 + KT)/N, the output signal Q, the synchronizing signals B1, B2, B3 and B4, the reset signal R and the clock pulses CL.

Figure 18:
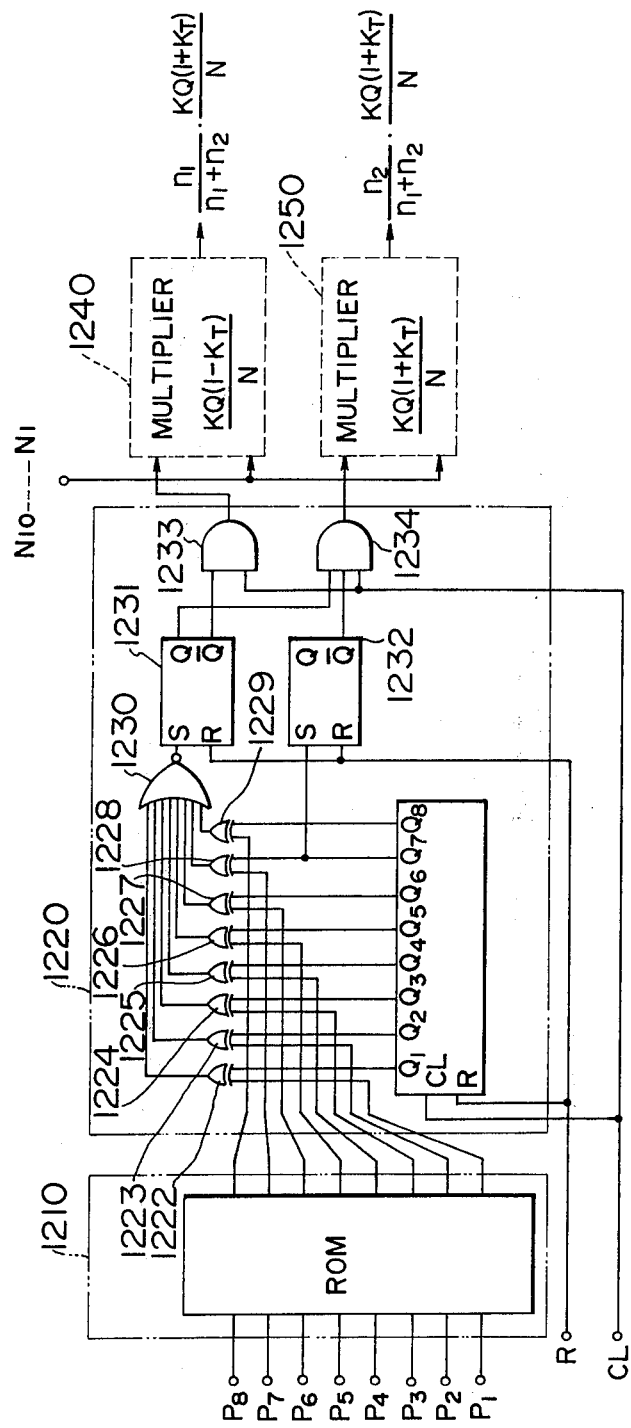
FIG. 18 is a block diagram of a fuel injection quantity ratio changing device thereof.

Next referring to FIGS. 16, 18 and 20, the construction and mode of operation of the fuel injection ratio changing device 1200 will be described in detail hereinafter. A read-only memory 1210 is so programmed as to generate the output in binary code representative of the characteristic curve (indicated by the broken line curve) in FIG. 14 in response to the binary coded output signal P8 ... P1 representative of the intake air quantity Q from the control circuit 1100. When the intake air quantity Q exceeds 30 g/sec., the binary coded output signal from the read-only memory 1210 changes to 01000000 (64 in decimal code).

A distributor circuit 1220 comprises a binary counter 1221, eight EXCLUSIVE-OR gates 1222 through 1229, a NOR gate 1230, two R-S flip-flops 1231 and 1232 and two AND gates 1233 and 1234. After the binary counter 1221 and the RS-flip-flops 1231 and 1232 have been reset in response to the reset signal R, the binary counter 1221 starts counting the clock pulses CL. When the content in the binary counter 1221 coincides with the content of the memory 1210, the output signal 1 appears at the output terminal of the NOR gate 1230 so that the R-S flip-flop 1231 is set. When the content in the binary conter 1221 becomes 64, the R-S flip-flop 1232 is set in response to the output signal 1 at the Q7 output terminal of the counter 1221. Therefore, the clock pulses as indicated at (I1) and (I2) in FIG. 20 appear at the output terminals of the AND gates 1233 and 1234, respectively. The clock pulse signals $n_1$ and $n_2$ during the time intervals T1 and T2, respectively, shown at (I1) and (I2) in FIG. 20, change in response to the binary coded output signal from the read-only memory 1210, but their sum ($n_1 + n_2$) remains constant.

Figure 17A:
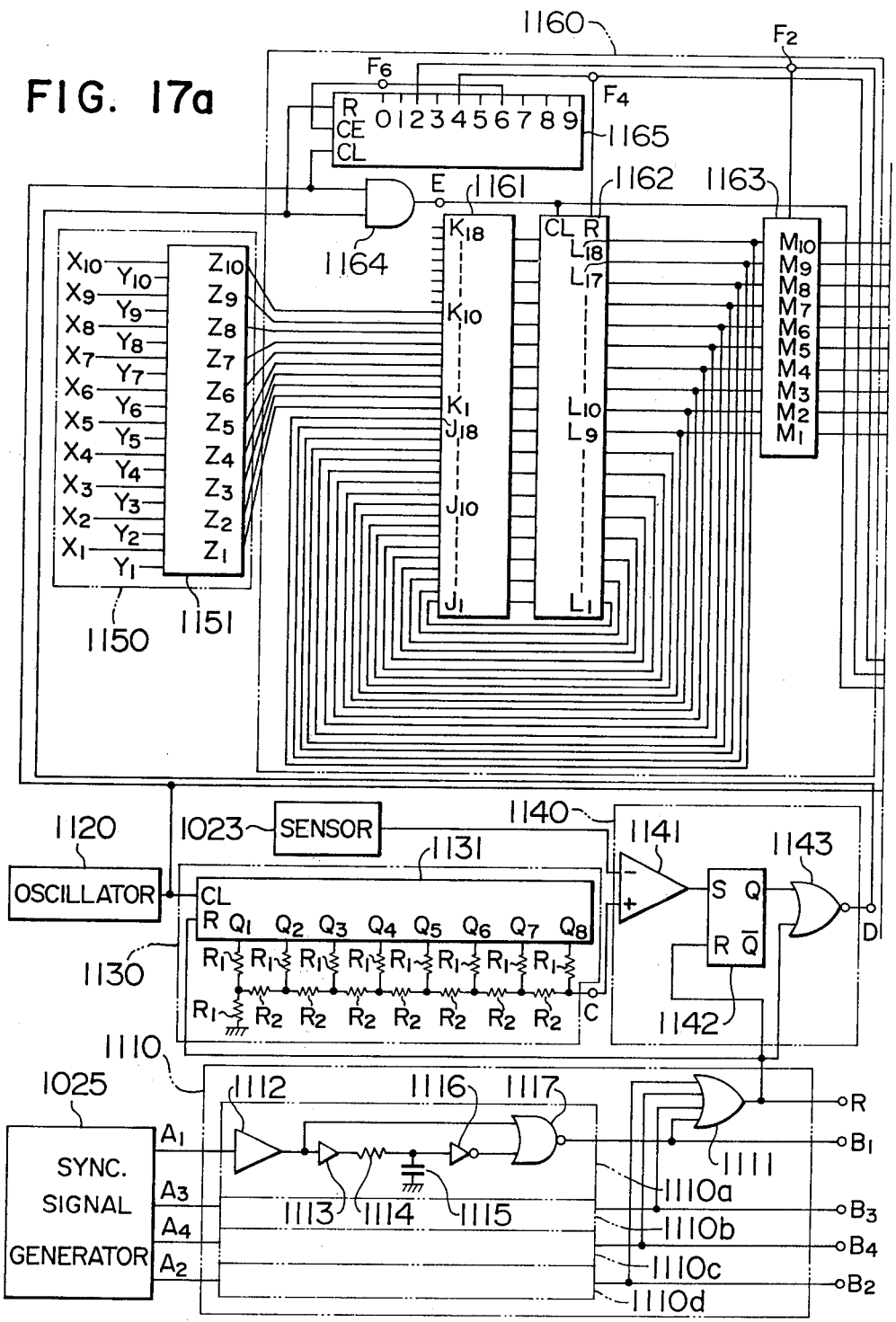
FIGS. 17a and 17b show a detailed block diagram thereof.
Figure 17B:
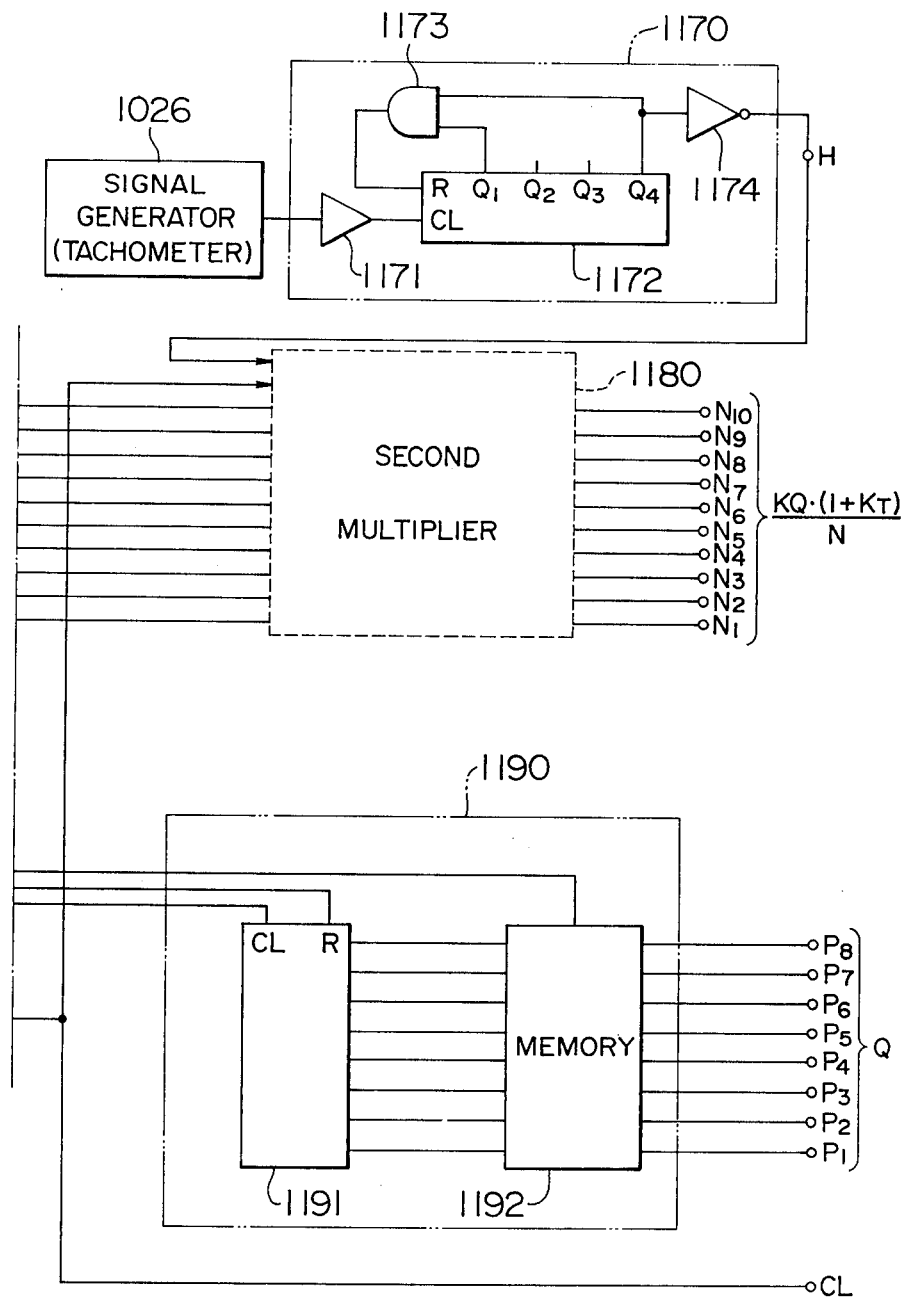

A first multiplier 1240 and a second multiplier 1250 are substantially similar in construction to the first multiplier shown in FIG. 17a. The first multiplier 1240 adds the binary coded output signal N10 ... N1 (representative of KQ(1 + KT)/N)) from the control circuit 1100 $n_1$ times (the number of clock pulses indicated at (I1) in FIG. 20). The second multiplier 1250 adds the binary coded output signal N10N9 ... N1 from the control circuit 1100 $n_2$ times (the number of clock pulses from the distributor circuit 1220 indicated at (I2) in FIG. 20). In the instant embodiment, KQ(1 + KT)/N is a constant, and the output from the first multiplier 1240 is 100% when $n_1 = 64$ and $n_2 = 0$ (the output from the second multiplier 1250 being 0%) while the output of the second multiplier 1250 is 100% when $n_1 = 0$ and $n_2 = 64$ (the output from the first multiplier 1240 being 0%). When $n_1$ is, for instance 54 ($n_2$ being 10), 54/64 = 0.84 so that the output from the first multiplier 1240 is 84% while the output from the second multiplier 1250, 16%. That is, the first multiplier 1240 produces the binary coded signal representative of $$\frac{KQ(1 + KT)}{N} \cdot \frac{n_1}{n_1 + n_2}$$

while the second multiplier 1250 produces the binary coded output signal representative of $$\frac{KQ(1 + KT)}{N} \cdot \frac{n_2}{n_1 + n_2}$$

Since the output from the read-only memory 1210 represents the characteristic curve (indicated by the broken lines) shown in FIG. 14, the outputs from the first and second multipliers 1240 and 1250 represent the broken-line and solid-line characteristic curves, respectively, shown in FIG. 14.

Referring back to FIGS. 16, the first and second converters 1300 and 1400 convert the binary coded output signals P10 ... P1 from the first multiplier 1240 representative of $$\frac{n_1}{n_1 + n_2} \cdot \frac{Q(1 + KT)}{N}$$

and the binary coded signal S10 ... S1 from the second multiplier 1250 representative of $$\frac{n_2}{n_1 + n_2} \cdot \frac{Q(1 + KT)}{N}$$

into the pulses with the pulse durations $\tau$ representative of the above outputs, respectively. The output pulse signals from the first and second converters 1300 and 1400 are applied to the first and second amplifiers 1500 and 1600, respectively, so that the power-amplified signals may be applied to the fuel injection nozzles.

Figure 19:
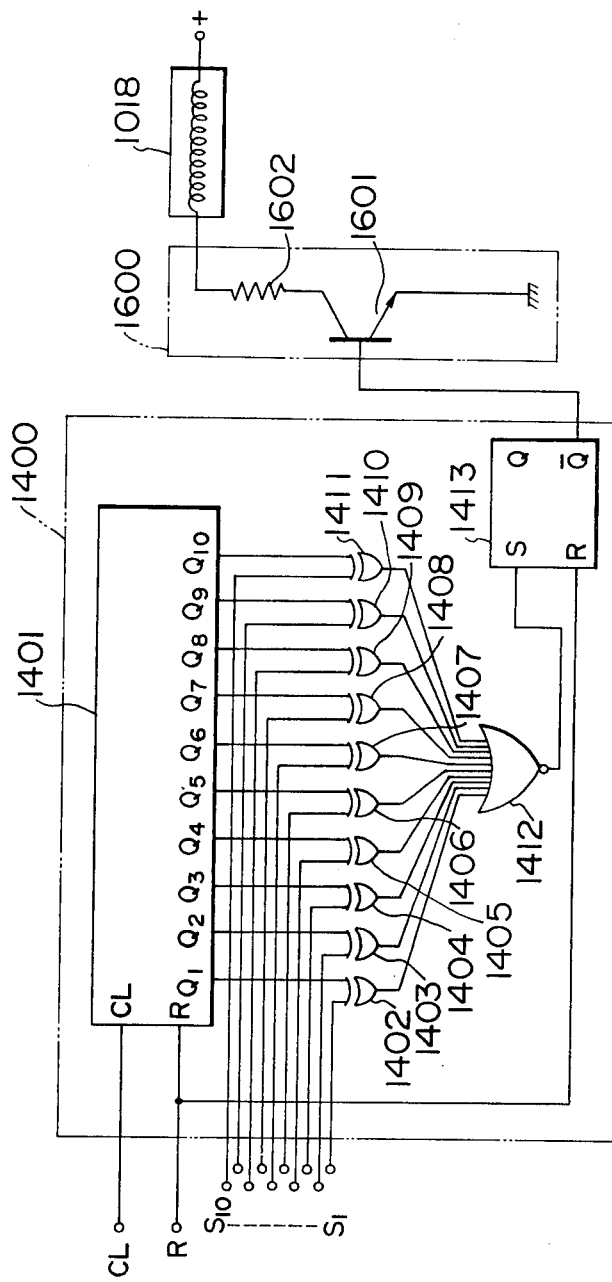
FIG. 19 is a block diagram of a converter and a power amplifier thereof.

Next referring to FIGS. 19 and 20, the construction and mode of operation of the second converter 1400 and amplifier 1600 will be described in more detail hereinafter. The converter 1400 comprises a binary counter 1401, ten EXCLUSIVE-OR gates 1402 through 1411, a NOR gate 1412, and a R-S flip-flop 1413. The power amplifier 1600 comprises a transistor 1601 and a resistor 1602. The amplifier 1600 is connected to the solenoid of the second fuel injection nozzle shown in FIG. 15. When the binary counter 1401 and the R-S flip-flop 1413 are reset in response to the reset signal R from the control circuit 1100, the counter 1401 starts counting the clock pulses CL from the control circuit 1100. When the content in the binary counter 1401 coincides with the binary coded output signal S10 ... S1 from the converter 1250, the R-S flip-flop 1413 is set. The time $\tau_5$ from the time when the R-S flip-flop 1413 is reset to the time when it is agains reset; that is the time duration when the output 1 appears at the Q output terminal, is in proportion to the binary coded output signal from the converter 1250, and during the period $\tau_5$, the power amplifier 1600 energizes the coil of the fuel injection nozzle 1018 for injecting the air into the throttle chamber. The converter 1300 and the amplifier 1500 are substantially similar in construction and mode of operation to the converter 1400 and the amplifier 1600, but they are provided for each cylinder of the engine. The input signals to the converter 1300 are the binary coded output signal P10 . . . P1 from the multiplier 1240, the synchronizing signal B1, B2, B3 or B4 and the clock pulses CL from the control circuit 1100. Thus, the first fuel injection nozzles for the first through fourth cylinders of the four-cylinder four-cycle internal combustion engine and the second nozzle inject the fuel in synchronism with the synchronising signals B1, B2, B3 and B4 and the reset signal R as indicated at (T1), (T2), (T3), (T4) and (T5) in FIG. 20.

The mode of operation will be described in more detail hereinafter. The first injection nozzle 1017 at each cylinder intake port is opened in response to the output signal T1, T2, T3 or T4 from the amplifier 1500 shown in FIG. 16 during the suction stroke. Therefore, the fuel is injected through the first nozzle 1017 during the suction stroke. In response to the output signal T5 from the amplifier 1600 shown in FIG. 16, the second injection nozzle 1018 is opened each time when one of the first injection nozzles 1017 is opened. Therefore, the fuel is injected through the second injection nozzle 1018 four times for each cycle each during the suction stroke of each cylinder.

The mode of operation during the suction stroke of the second embodiment is substantially similar to that of the first embodiment described with reference to FIG. 5. The compression, expansion and discharge strokes are substantially similar to those of the conventional stratified internal combustion engines. However, according to the present invention, the air-fuel mixture in which the fuel is satisfactorily vaporized is charged into the cylinder so that the positive and complete stratified combustion causing any combustion lag or misfire may be ensured. Therefore, the unburned fuel or gases are not discharged, whereby the purification of the exhaust gases may be attained.

In addition to the mode of operation described hereinbefore, the following operations may be accomplished in accordance with the present invention. The injection quantity ratio changing device 1200 shown as comprising the read-only memory 1210, the distributor circuit 1220, the multipliers 1240 and 1250 and the converters 1300 and 1400, changes, in response to the intake air quantity Q, the ratio of the injection quantity through the first injection nozzle 1017 to the total injection quantity during each cycle and the ratio of the fuel injection quantity through the second fuel injection nozzle 1018 to the total fuel injection quantity for each cycle as indicated by the broken- and solid-line curves shown in FIG. 14. More particularly, the ratio of the fuel injection quantity through the second nozzle 1018 is decreased with the increase in the intake air quantity Q. (This ratio becomes zero when the intake air quantity Q exceeds 30 g/sec.). In general, the intake air quantity Q is increased when the engine is running at a high speed and/or under a high load so that the injected fuel may be satisfactorily vaporized before it is ignited. The purpose of the fuel injection through the second injection nozzle is to attain as complete vaporization of the fuel as possible. Therefore, when the fuel can be satisfactorily vaporized even when it is injected through the second injection nozzle, it is useless to do so. Furthermore, as described hereinbefore, the fuel injection through the second nozzle results in the poor response of the engine operation during the transient period, and the uniform distribution of the lean mixture into the cylinders from the throttle chamber cannot be ensured.

However, according to the present invention, the injected fuel may be satisfactorily vaporized before it's ignition time, and the above slow response and undesirable non-uniform distribution of the combustion mixture may be overcomed.

As described hereinbefore, according to the second embodiment, the stratified combustion of the mixture in which the fuel is satisfactorily vaporized may be attained without resulting in the slow engine response and undesirable non-uniform mixture distribution, and the pollutant emission may be minimized.

Third Embodiment FIGS. 23 through 27

The fuel in the rich mixture to be delivered to the cylinders of the engine for starting or operation in cold weather must be completely vaporized before ignited. According to the third embodiment of the present invention the extra quantity of the fuel needed for enriching the mixture is injected through the second fuel injection nozzle opening at the throttle body, whereby the smooth starting and operation in cold weather may be ensured.

Figure 21:
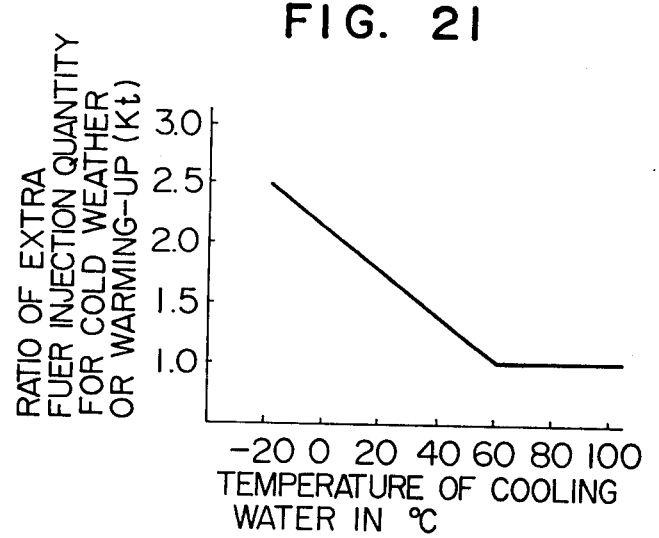
FIGS. 21 and 22 show the extra fuel injection characteristic curves for starting and operation in cold weather or during warming-up, respectively, these diagrams being used in the explanation of a third embodiment of the present invention.
Figure 22:
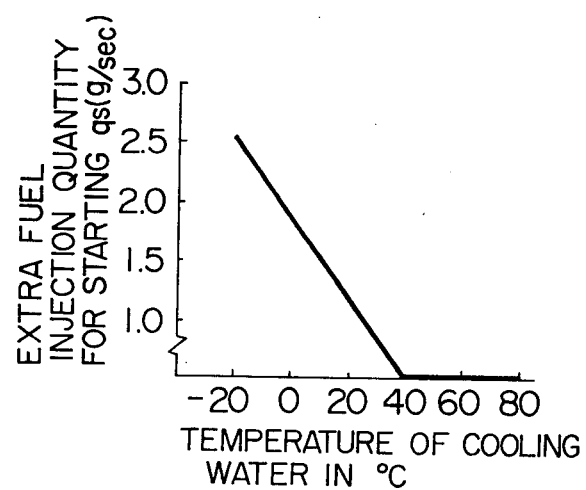

It is preferable that the extra injection quantity through the second fuel injection nozzle for starting or operation in cold weather may be varied in response to the temperature of the cooling water of the engine as shown in FIGS. 21 and 22, the former showing the relationship between the temperature of the cooling water and the extra injection quantity for operation in cold weather while the latter, the relationship between the temperature of the cooling water and the extra injection quantity for starting. The extra fuel injection period for starting may be determined depending upon the characteristics of the engine. For instance, the extra fuel injection period for starting may be made equal to the time during which the starting motor is driven. The extra injection quantity may be gradually decreased after the engine is started. It is well known that when the intake air quantity is increased, the fuel in the mixture may be well vaporized before ignited. Therefore, in the third embodiment the ratio of the injection quantity through the first fuel injection nozzle opening at the intake passage in the proximity of the intake port to the total injection quantity during each cycle as well as the ratio of the injection quantity through the second fuel injection nozzle to the total injection quantity may be varied along the curves shown in FIG. 14 depending upon the operating conditions of the engine. The ratio of the injection quantity through the first injection nozzle is indicated by the broken-line curve Ka in FIG. 14.

The third embodiment of the present invention will be described hereinafter as being applied to the four-cylinder engine with reference to FIG. 23, in which the same reference numerals used in the first embodiment are also used to designate similar parts. In the third embodiment is also employed an electronically controlled fuel injection system generally indicated by the reference numeral 2000 including a first solenoid controlled fuel injection nozzle 2017 opening at the intake passage 11 and a second solenoid controlled fuel injection valve 2017 opening at the throttle body 14'. Both the first and second injection nozzles 2017 and 2018 are positioned and directed in a manner substantially similar to that described in the first embodiment. The fuel injection system 2000 includes a fuel injection control device including a fuel supply device 2001 for delivering the pressurized fuel to the first and second injection nozzle 2017 and 2018, a sensor system for generating the various signals representative of the operating conditions of the engine, and a valve opening timing and period control device 2022 for controlling the valve opening timing and period of the first and second fuel injection nozzles 2017 and 2018 in response to the output signals from the sensor system. The fuel supply device generally indicated by the reference numeral 2001 is substantially similar in construction and mode of operation to that of the second embodiment described elsewhere so that no description thereof shall be made.

The control device 2022 controls the second fuel injection nozzle 2018 in such a way that the injection quantity through the latter may be controlled along the characteristic curve indicated in FIG. 21 in response to the temperature T of the cooling water and that the extra injection quantity through the second injection nozzle 2018 may be controlled along the characteristic curve indicated in FIG. 22 only during the starting motor is driven, in response to the temperature of the cooling water. Furthermore, the control device 2022 controls the ratio $\lambda f$ of the injection quantity through the second injection nozzle 2018 to the total injection quantity during each cycle of the engine in response to the intake air quantity as indicated by the solid-line characteristic curve in FIG. 14.

The sensor system comprises a first sensor 2023 for generating the electrical signal representative of the intake air quantity; a synchronizing signal generator 2024 for generating the synchronizing signals in synchronism with the rotation of the crankshaft 4a; a second sensor 2025 for generating the electrical signal respresentative of the temperature of the cooling water circulating through the water jacket 3; and a tachometer 2029 for generating the electrical signals of the frequency in proportion to the rotational speed of the engine. It should be noted that in the third embodiment the ON and OFF signals representing that a starting motor 2026 is energized and de-energized, respectively, are also applied to the fuel injection control device 2022. The intake air quantity sensor 2023, the synchronizing signal generator 2024 and the cooling water temperature sensor 2025 are substantially similar in construction and mode of operation to those of the second embodiment described hereinbefore. The starting motor 2026 is connected through a starter switch 2027 to a power supply or battery 2028.

Figure 24:
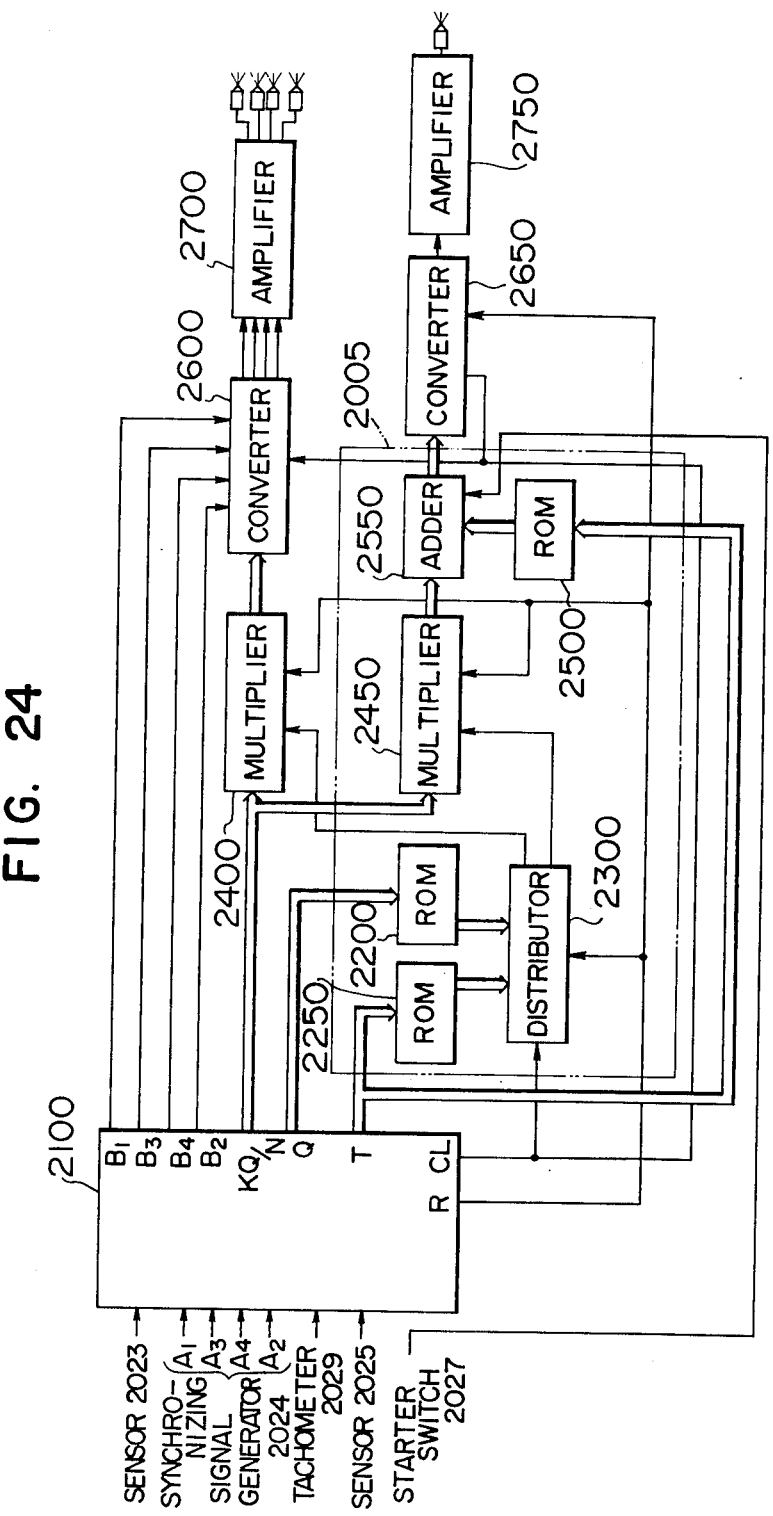
FIG. 24 is a block diagram of a fuel injection control device thereof.

Next referring to FIG. 24, the fuel injection control device 2022 will be described in detail hereinafter. A control circuit 2100 receives the output electrical signals from the intake air sensor 2023, synchronizing signal generator 2024, tachometer 2029, water temperature senstor 2025 and the starter system, and shapes and operates them to produce the output signal KQ/N, the output signal Q, the output signal T, the synchronizing pulses B1, B2, B3 and B4, the clock pulses CL and the reset signal R, wherein Q: intake air quantity (g/sec.);
N: rotational speed of engine;
X: proportionality constant for determining the relationship between the intake air quantity Q and the fuel injection period $\tau$; and
T: temperature of cooling water;

The output signals KQ/N, Q and T are produced as the binary coded signals.

A read-only memory 2200 generates, in response to the output signal Q from the control circuit 2100, the binary coded signal representative of the broken line characteristic curve Ka shown in FIG. 14. In like manner, a read-only memory 2250 generates, in response to the output signal T from the control circuit 2100, the binary coded signal representative of the characteristic curve Kt (solid line curve) shown in FIG. 21.

In response to the output signals Ka and Kt from the read-only memories 2200 and 2250, respectively, a distributor circuit 2300 generates the clock pulses representative of the output Ka from the read-only memory 2200 and the clock pulses the number of which represents $(1 - Ka)Kt$.

A first multiplier 2400 generates a binary coded signal representative of $$Ka\ KQ/N$$

by adding the binary coded output signal KQ/N a number of times equal to the number of clock pulses representative of Ka from the distributor circuit 2300. In like manner a second multiplier 2450 generates the binary coded output signal representative of $$(1 - Ka)Kt\ KQ/N$$

A read-only memory 2500 generates the binary coded output signal representative of $qs$ shown in FIG. 22 in response to the temperature of the cooling water T. A summing circuit 2550 generates the binary coded output signal by adding the output $(1 - Ka)Kt$ KQ/N from the multiplier 2450 and the binary coded output from the read-only memory 2500 only during the starter switch 2027 (See FIG. 23) is closed. The summing circuit 2550 passes the binary coded output signal from the multiplier 2450 when the starter switch 2027 is opened.

Converters 2600 and 2650 convert the binary coded output signals from the multiplier 2400 and the summing circuit 2550 into the pulses whose durations change in response to the above outputs. In response to the outputs from the converters 2600 and 2650, power amplifiers 2700 and 2750 energize the solenoids of the first and second injection nozzles 2017 and 2018 to open them for the period $\tau$. More particularly, the power amplifiers 2700 energizes the solenoid of the first fuel injection nozzle 2017 during the suction stroke of each cylinder. The second power amplifiers 2750 energies the solenoid of the second fuel injection nozzle 2018 during every power stroke of the cylinders. The control circuit 2100 also serves as extra fuel injection means for causing the second fuel injection nozzle 2018 to inject the extra fuel for starting and operation in cold weather. In the figure, the double lines indicate the binary coded signals, while the single lines do mean the signals transmitted in series, but not means one lead wire.

Figure 25A:
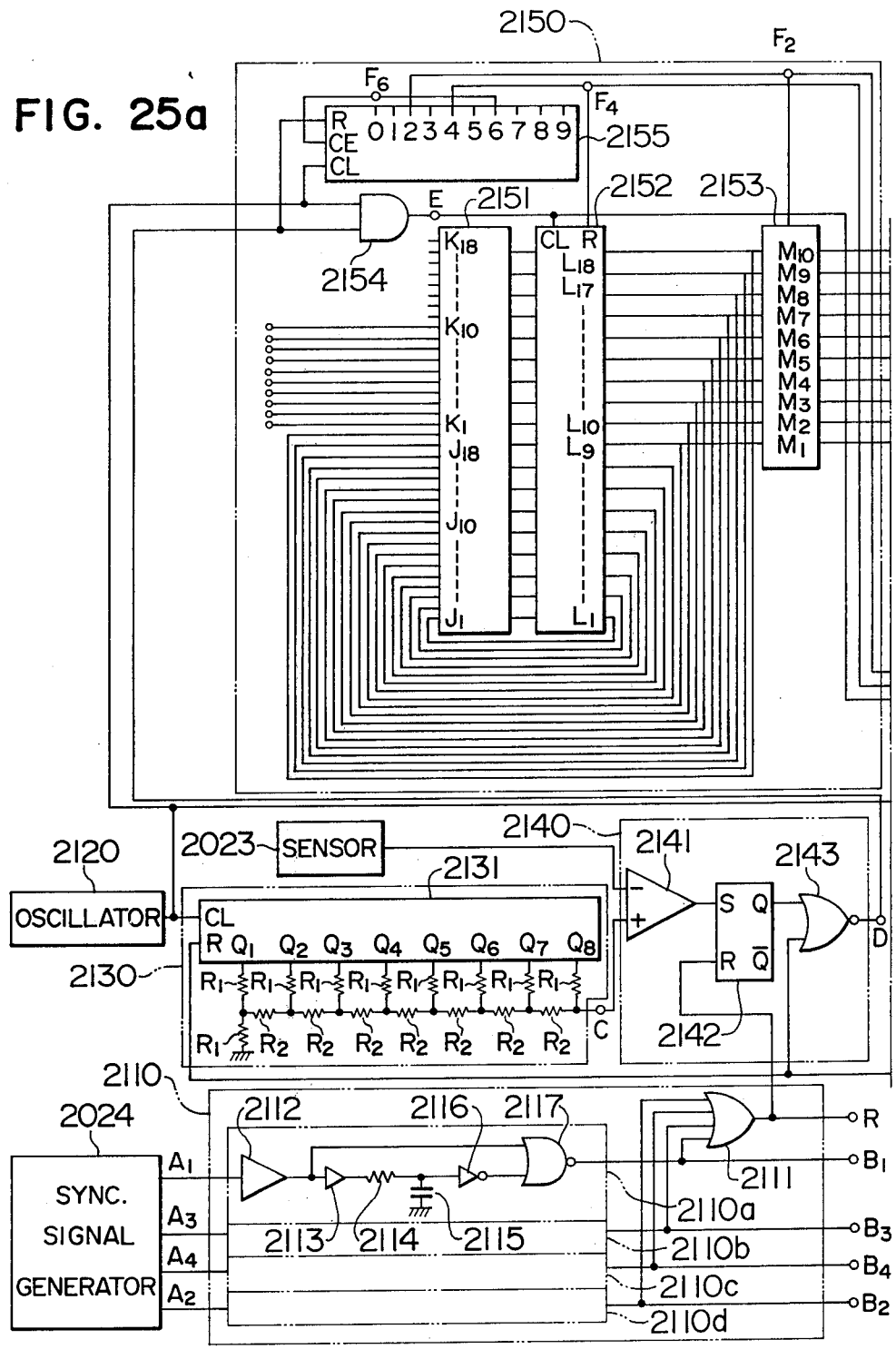
FIGS. 25a and 25b show a detailed block diagram of a control circuit thereof.
Figure 25B:
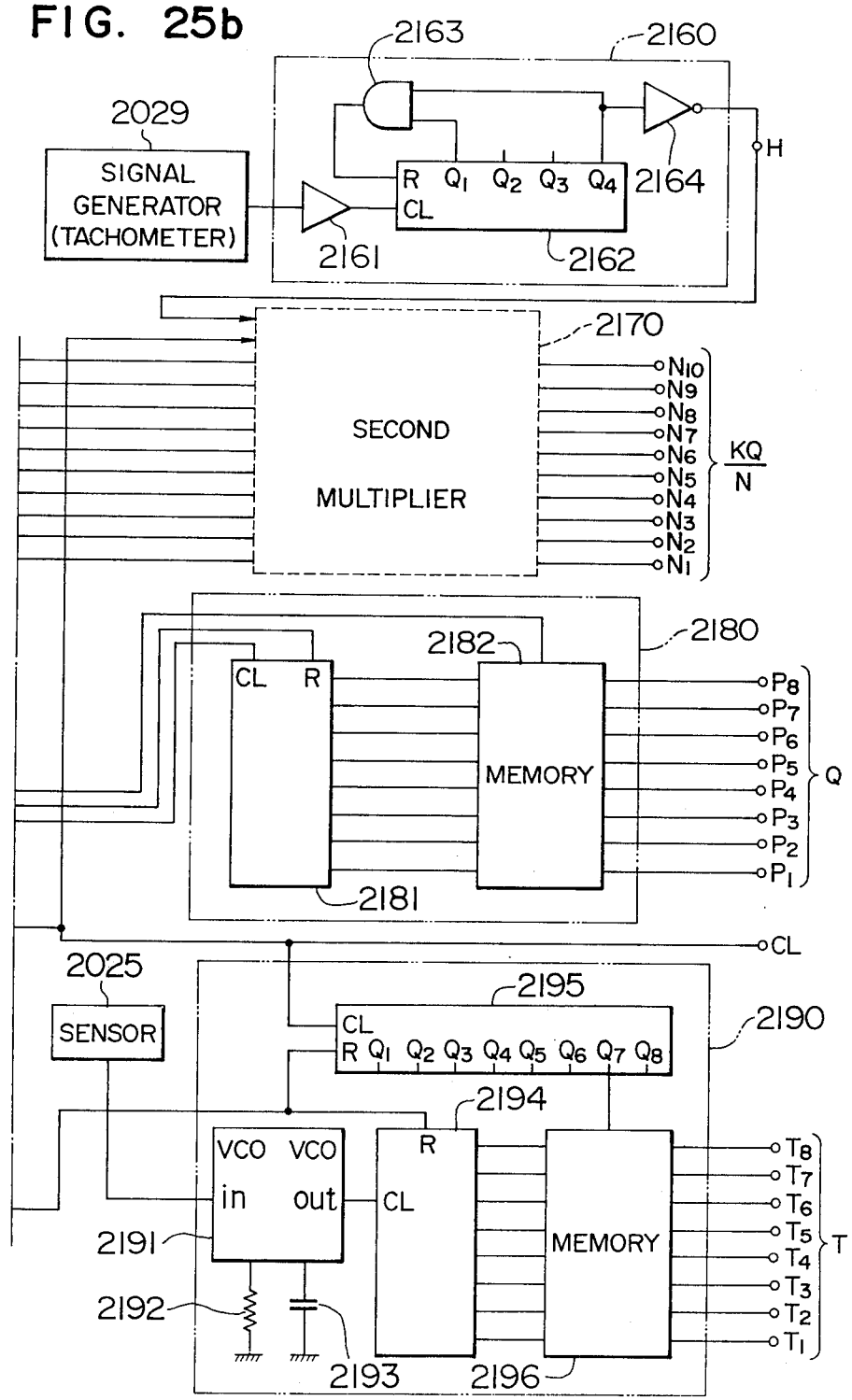

Next referring to FIGS. 25a and 25b and FIG. 27, the construction and mode of operation of the control circuit 2100 will be described in more detail hereinafter. The synchronizing signal generator 2024 is substantially similar in construction to that of the second embodiment, and generates the synchronizing signals for every ½ rotation of the crankshaft 4a as indicated at (A1), (A2), (A3) and (A4) in FIG. 27 and in synchronism with the suction strokes of the first, second, third and fourth cylinders of the engine.

Figure 27:
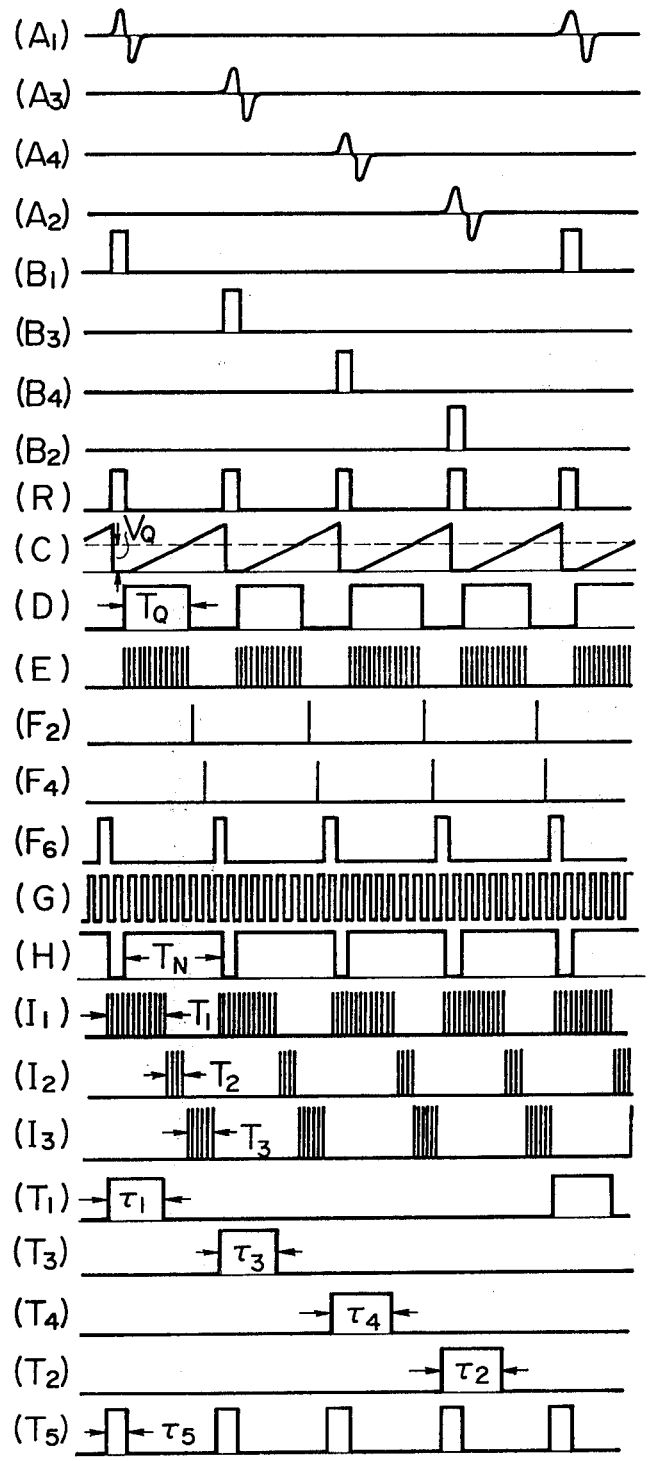
FIG. 27 shows the waveforms of various signals used for the explanation of the devices shown in FIGS. 24, 25 and 26.

A shaping circuit 2110 is substantially similar in construction to that of the second embodiment, and amplifiers and shapes the synchronizing signals A1, A2, A3 and A4 to generate the synchronizing signals B1, B2, B3 and B4 as indicated at (B1), (B2), (B3) and (B4) in FIG. 27 and the reset signal R indicated at (R) in FIG. 27.

An oscillator 2120 and a D-A converter 2131 are substantially similar in construction to those of the second embodiment. The sawtooth wave voltage output signal as indicated at (C) in FIG. 27 appears at the output terminal C of the converter 2130.

An comparator system 2141 compares the sawtooth wave voltage output signal ((C) in FIG. 27) from the D-A converter 2130 with the output voltage signal VQ (indicated by the dotted lines in FIG. 27(C)) from the intake air quantity sensor 2023. When the sawtooth wave voltage output signal C exceeds the output voltage signal VQ, the output of the comparator system 2141 changes to 1, in response to which a R-S flip-flop 2142 is set. In response to the Q output signal from the R-S flip-flop 2142 and the reset signal R, the pulse signal D indicated at (D) in FIG. 27 appears at the output terminal D of a NOR gate 2143. The duration TQ of this output pulse signal is in proportion to the intake air quantity Q.

A first multiplier 2150 is also substantially similar in construction to that of the second embodiment. The output L18 ... L1 from a memory 2152 is applied as an input J18J17 ... J1 to a parallel adder 2151. Another input K10K9 ... K1 to the parallel adder 2151 is a binary coded signal representative of the constant K. A counter 2155 with a decimal divider 2155 is so arranged that when it has received six clock pulses, it stops counting. When the output pulse signal 1 with the pulse duration TQ appears from the comparator system 2140, a number of n clock pulses, which is in proportion to the pulse duration TQ, passes through an AND gate 2154 and appears at the output terminal thereof as indicated at (E) in FIG. 27. When the output signal of the comparator system 2140 changes to 0, the counter 2155 starts again counting the clock pulses. When it counts the second, fourth and sixth clock pulses, the output signals 1s appear at the output terminals F2, F4 and F6, respectively, as indicated at (F2), (F4) and (F6) in FIG. 27. In response to the output signal generated when the counter 2155 counts the fourth clock pulse, the memory 2152 is reset so that its output L18L17 ... L1 changes to 00000000 ... 000. Thereafter, everytime when the clock pulses (indicated at (E) in FIG. 27) passes through the AND gate 2154, the output L18 ... L1 of the memory 2152 changes as follows:

$K10 ... K1,$
$2 \times K10 ... K1,$
$..., \text{and}$
$n \times K10 ... K1.$

In response to the clock pulse indicated at (F2) in FIG. 27, the memory 2152 holds as M10 ... M1 the upper 10 digits from MSD of the output $n \times K10 ... K1$. Since the number n of the clock pulses is in proportion to the intake air quantity Q while K10 ... K1 is a binary coded signal representative of the contant K, the first muliplier 2150 generates a binary coded signal representative of the product KQ.

The tachometer 2029 and a frequency divider 2160 are substantially similar to those of the second embodiment. The output signals from the tachometer 2029 are amplified and shaped by a DC amplifier 2161 into the pulse signals indicated at (G) in FIG. 27. The frequency of these pulse signals is divided by a binary counter 2162 by the factors 2, 4, 8 and 16. As soon as the frequency division by the factor 16 is started, the output of an AND gate 2165 changes to 1 so that the binary counter 2162 is reset. Therefore the pulse signal with the pulse duration TN appears at the output terminal H of an inverter 2164 as indicated at (H) in FIG. 27. The pulse duration TN equals 8 pulses signals indicated at (G) in FIG. 27, and is in proportion to a reciprocal 1/N of the rotational speed N of the engine.

A second multiplier 2170 is substantially similar in construction to the first multiplier 2150. While the first multiplier 2150 is connected to the oscillator 2120 and the comparator system 2140, the second multiplier 2170, to the frequency divider 2160, the oscillator 2120 and the first multiplier 2150. The second multiplier 2170 adds the output M10 ... M1 from the first multiplier 2150 a number of n' times, which equals the number of clock pulses generated by the oscillator 2120 during the pulse duration TN of the pulse signal (indicated at (E) in FIG. 27) from the frequency divider 2160. The product $n' \times M10 ... M1$ is represented by the output N10 ... N1. That is, the second multiplier 2170 executes the operation of $$K'Q/N,$$

and generates a binary coded signal representative thereof.

A binary converter 2180 comprises a binary counter 2181 and a memory 2182. The counter 2181 is reset in response to the output signal from the counter 2155 in the first multiplier, which output signal is generated when the counter 2155 counts the fourth clock pulse as described above. The counter 2181 starts counting the clock pulses passing through the AND gate 2154. When the counter 2153 counts the second clock pulse after it has been reset, the content of the counter 2181 is held by the memory 2182. Therefore, the output P8 ... P1 from the memory 2182 is a binary coded signal representative of the intake air quantity Q.

A binary converter 2190 for converting the electrical signal representative of the temperature of the cooling water into a binary coded signal, comprises a voltage controlled oscillator 2191 (for instance, IC, CD 4046, the product of RCA Corp.), a resistor 2192, a capacitor 2193, two binary counters 2194 and 2195 and a memory 2196. In response to the voltage output signal from the second or cooling water temperature sensor 2023, which may be of the thermistor type, the oscillation frequency of the oscillator 2191 changes. After the binary counters 2194 and 2195 have been reset in response to the reset signal R, the binary counter 2194 starts counting the clock pulses from the oscillator 2191 representative of the temperature T of the cooling water while the counter 2195 counts the clock pulses from the oscillator 2120. When the counter 2195 counts a predetermined number (64 in the instant embodiment), the memory 2196 holds the content of the counter 2194. The output T8T7 . . . T1 from the memory 2198 is a binary coded signal representative of the temperature T of the cooling water. Thus, the control circuit 2100 shown in FIG. 24 generates the binary coded signals representative of KQ/N, Q and T, the synchronizing signals B1, B2, B3 and B4, the reset signal R and the clock pulses CL.

Figure 26A:
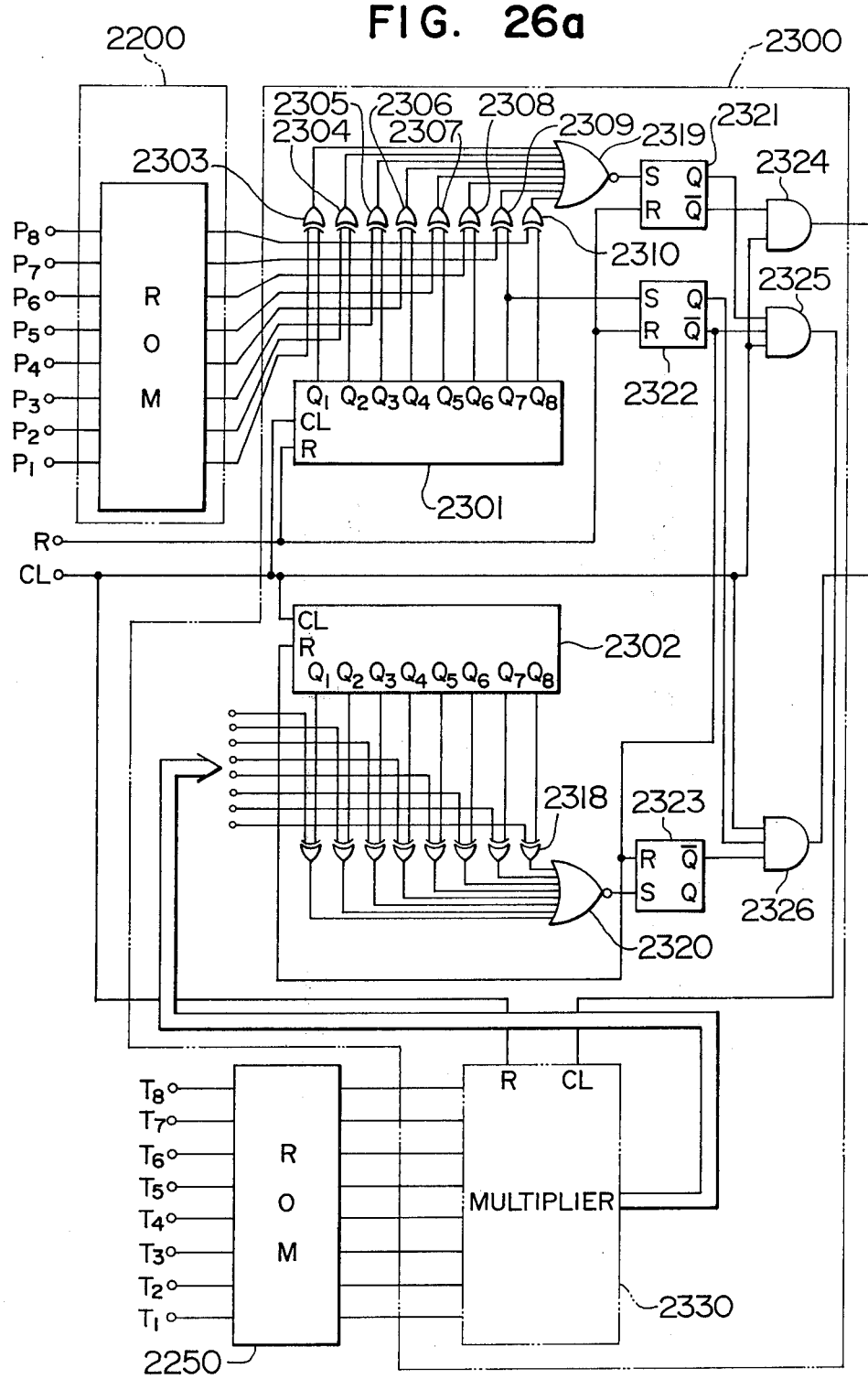
FIGS. 26a and 26b show a detailed block diagram of an extra fuel injection quantity control device thereof.
Figure 26B:
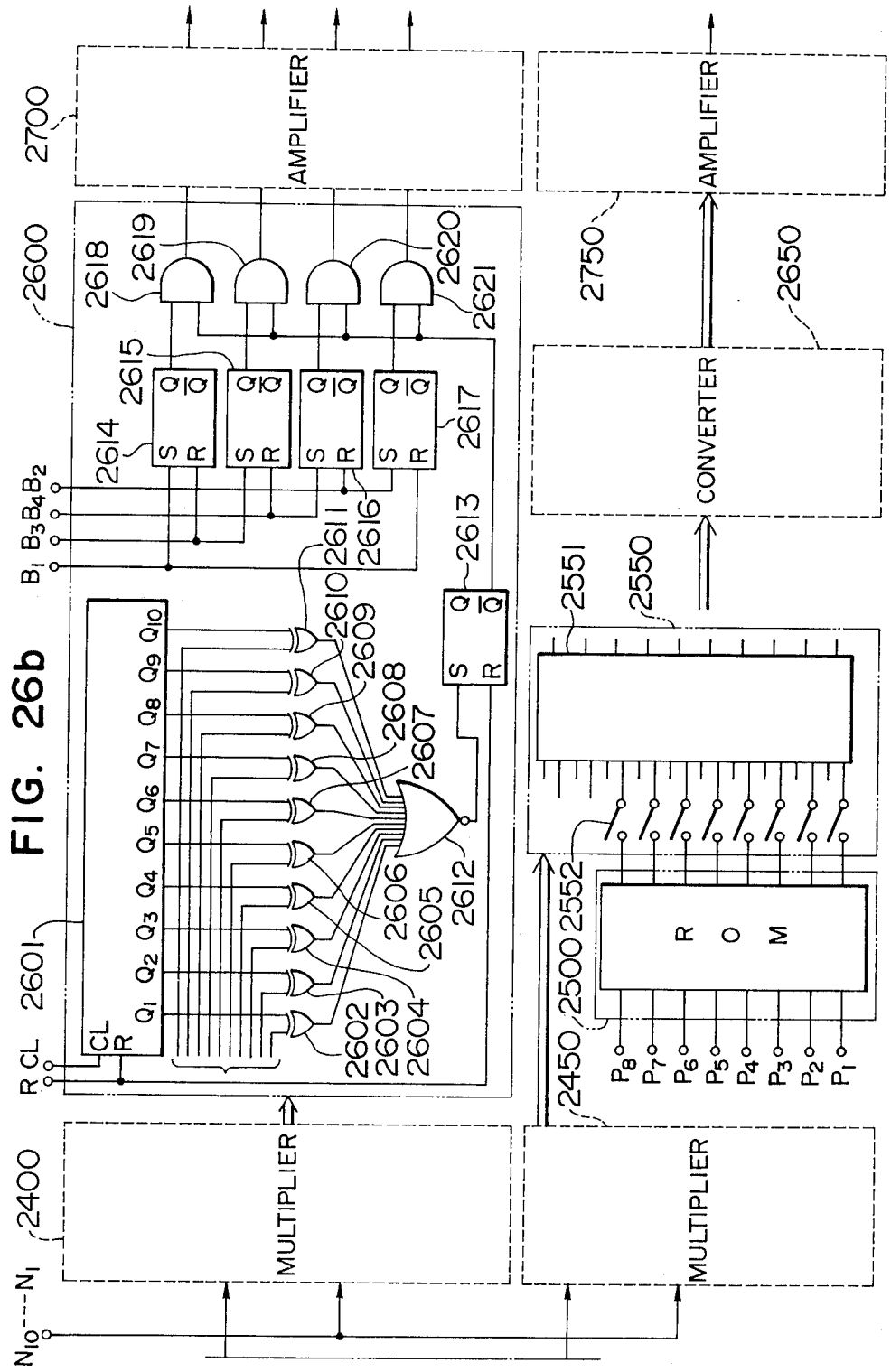

Next referring to FIGS. 26a and 26b, and FIG. 27, the construction and mode of operation of the control device 2022 except the control circuit 2100 will be described in detail hereinafter. A first read-only memory 2200 and a second read-only memory 2250 are so programmed that they generate the binary coaded signals representative of the characteristic curves $Ka$ (shown in FIG. 14) and $Kt$ (shown in FIG. 21), respectively, in response to the binary coded input signal P8P7 . . . P1 representative of the intake air quantity Q and the binary coded input signal T8T7 . . . T1 representative of the temperature T of the cooling water. Each of the first and second read-only memories 2200 and 2250 may be of the conventional type comprising two read-only memory elements such as HPROM1024, the product of Harris Corp. The first read-only memory 2200 is so programmed that when the intake air quantity Q exceeds 30 g/sec., the binary coded output signal changes to 01000000 (64 in decimal code); while when the temperature T of the cooling water exceeds 60° C, the binary coded output signal from the second read-only memory 2250 changes to 00000000.

A distributor circuit 2300 comprises two binary counters 2301 and 2302, EXCLUSIVE-OR gates 2303 through 2318, NOR gates 2310 and 2320, R-S flip-flops 2321, 2322 and 2323, AND gates 2324, 2325 and 2326, and a multiplier 2330 substantially similar to the multiplier 2150 in the control circuit 2100. After the binary counter 2301, the multiplier 2330 and R-S flip-flops 2321 and 2322 have been reset in response to the reset signal R indicated at (R) in FIG. 27, the counter 2301 starts counting the clock pulses CL. When the content in the binary counter 2301 coincides with the output from the read-only memory 2200, the output from the NOR gate 2319 changes to 1, in response to which is set the R-S flip-flop 2321. When the content in the binary counter 2301 becomes 64, the output signal 1 appears at the output terminal Q7, and sets the flip-flop 2322. Therefore, the clock pulses as indicated at (11) and (12) in FIG. 27 appear at the output terminals of the AND gates 2324 and 2325, respectively. The numbers $n$ and $n'$ of the clock pulses within the time widths T1 and T2 shown at (11) and (12) in FIG. 27 change in response to the binary coded output signal from the first read-only memory 2200, but their sum $(n_1 + n_2)$ remains constant (= 64 in the instant embodiment). In response to the output; that is, the number of $n_2$ clock pulses, from the AND gate 2325, the multiplier 2330 adds the output $Kt$ from the second read-only memory 2250 $n_2$ times and generates the binary coded signal representative of $n_2 \times Kt$. When the flip-flop 2322 is set, both the R-S flip-flop 2325 and the binary counter 2302 are reset so that the latter starts counting the clock pulses CL from the oscillator 2120. When the content in the binary counter 2302 coincides with the output from the multiplier 2330, the output from the NOR gate 2320 sets the RS-flip-flop 2323 so that the ANd gate 2326 passes the number of $n_3$ clock pulses CL during the time duration T₃ indicated at (I3) in FIG. 27. As described hereinbefore, the first and second read-only memories 2200 and 2250 generate the binary coded signals representative of the characteristic curves $Ka$ and $Kt$ shown in FIGs. 14 and 21, respectively, so that the numbers $n_1$, $n_2$ and $n_3$ of the clock pulses are in proportion to $Ka$, $Kb(= 1 - Ka)$ and $Kt \times Kb$, respectively.

Both multipliers 2400 and 2450 are substantially similar in construction to the first multiplier 2150 shown in FIG. 25. The multiplier 2400 adds $n_1$ times the binary coded output signal N10 . . . N1 (representative of KQ/N, fuel injection quantity) from the control circuit 2100, and generates the binary coded output signal representative of the product $n_1 \times$ KQ/N. the multiplier 2460 addes the binary coded output signal N10 . . . N1 from the control circuit 2100 a number of $(n_2 + n_3)$ times (See FIG. 27(I4), and generates the binary coded signal representative of the product $(n_2 + n_3) \times$ KQ/N. That is, the multiplier 2400 attains KaKQ/N while the multiplier 2450, K$b$K$t$KQ/N.

Figure 23:
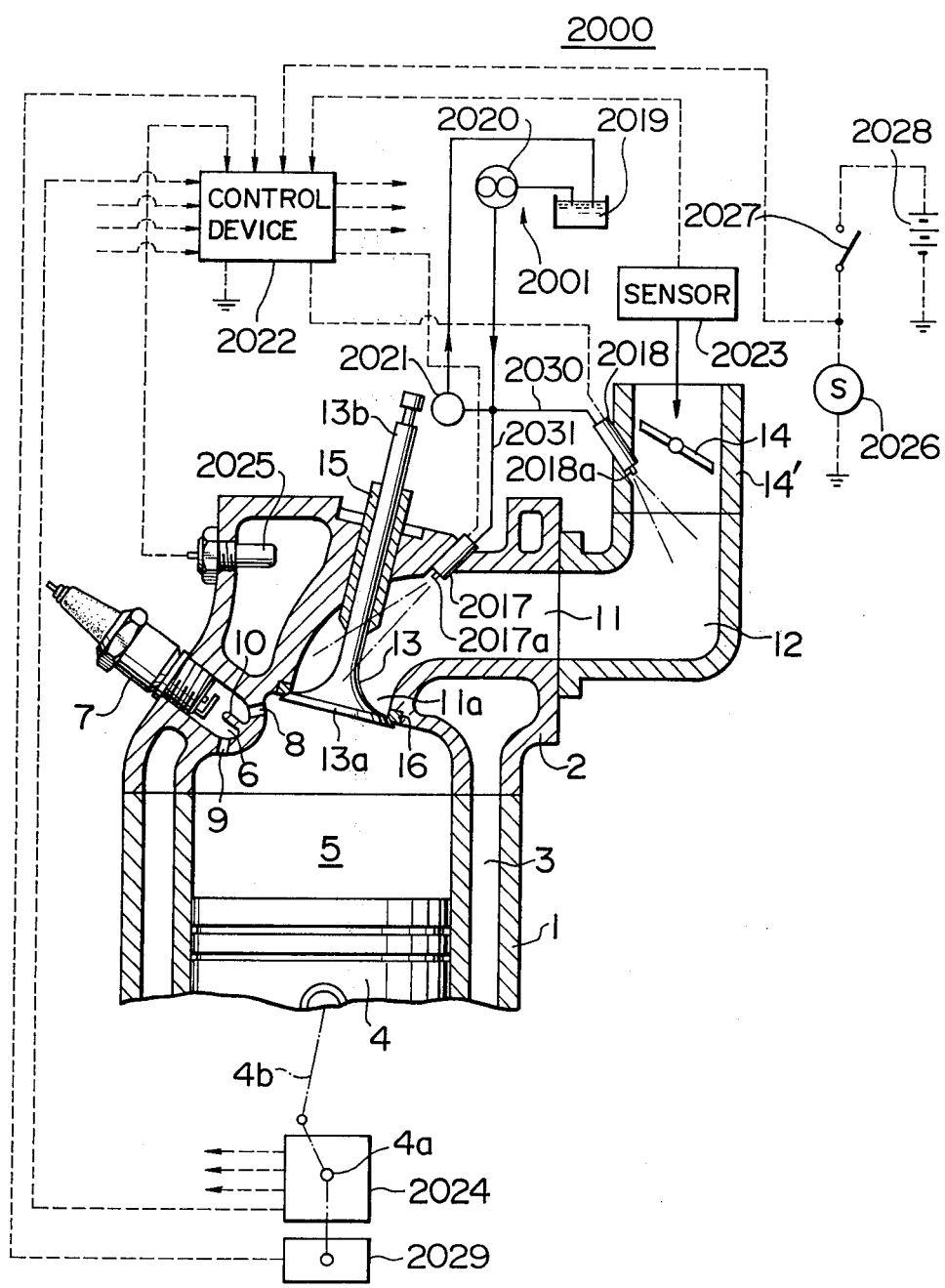
FIG. 23 is a fragmentary sectional view of an internal combustion engine incorporating the third embodiment of the present invention.

A read-only memory 2500 is so programmed that it generates the output signal representative of the characteristic curve $qs$ shown in FIG. 23 in response to the temperature T of the cooling water, which is applied as the binary coded signal T10 . . . T1 from the control circuit 2100.

A summing circuit 2550 comprises a parallel adder 2551 and a bank of switches 2552 which are closed only when the starter switch 2027 (See FIG. 23) is closed. It adds the binary coded output signal from the multiplier 2450 (indicated by the arrow) to the binary coded output signal from the read-only memory 2500 to generate the binary coded signal representative of the sum.

Next the mode of operation of the summing circuit 2550 for controlling the extra injection quantity $qs$ for starting in response to the temperature T of the cooling water will be described hereinafter. When the engine is started; that is, when the starter switch is closed, the output from the summing circuit 2550 is K$b$K$t$K$q$/N + $qs$, but is K$b$K$t$KQ/N except when the engine is started.

A converter 2600 comprises a binary counter 2601, EXCLUSIVE-OR gates 2602 through 2611, a NOR gate 2612, R-S flip-flops 2613 through 2617, and AND gates 2618 through 2621. After the counter 2601 and R-S flip-flop 2613 have been reset in response to the reset signal R from the control circuit 2100, the counter 2601 starts counting the clock pulses CL from the control circuit 2100, and when the content in the counter 2601 coincides with the output S10S9 . . . S1 from the multiplier 2400, the R-S flip-flop 2613 is set. The time interval from the time when the R-S flip-flop 2613 is reset to the time when it is set; that is, the time period during which the output 1 appears at its Q output terminal, is in proportion to the binary coded signal from multiplier 2400. The R-S flip-flop 2614 is set in response to the synchronizing signal B1 and is reset in response to the synchronizing signal B2. The R-S flip-flop 2615 is set in response to the synchronizing signal B2 and is reset in response to the synchronizing signal B4. The R-S flip-flop 2616 is set in response to the synchronizing signal B4 and is reset in response to the synchronizing signal B2. The R-S flip-flop 2617 is set in response to the synchronizing signal B2 and is reset in response to the synchronizing signal B1. Therefore, the AND gates 2618, 2619, 2620 and 2621 generate the output signals 1s during the time intervals $\tau_1$, $\tau_2$, $\tau_3$ and $\tau_4$ (which are in proportion to the binary coded signals from the multiplier 2400 and in synchronism with the synchronizing signals B1, B2, B3 and B4, respectively.

The output pulse signals indicated at $(\tau_1)$, $(\tau_2)$, $(\tau_3)$ and $(\tau_4)$ in FIG. 27 from the AND gates 2618, 2610, 2620 and 2621 are applied through a power amplifier 2700 (which may be of the conventional type) to the solenoids of the first injection nozzles 2017 opening at the intake manifolds in communication with the first, third, fourth and second cylinders, respectively, so that the fuel may be injected during the suction stroke of each cylinder.

A converter 2650 and a power amplifier 2750 are substantially similar to the converter 2600 and the amplifier 2700 except that the R-S flip-flops 2614, 2615, 2616 and 2617 and the AND gates 2618, 2619, 2620, and 2621 may be eliminated. The converter 2650 generates the pulse signal with the pulse duration (indicated at $(\tau_5)$ in FIG. 27) which is in proportion to the binary coded output signal (representative of $KbKtKQ/N + qs$) from the adder 2550. The output pulse signal is amplified by the power amplifier 2750, and is applied to the solenoid of the second fuel injection nozzle 2018 so that the fuel may be injected into the throttle chamber 12 during the expansion stroke of each cylinder (that is, four times during each cycle of the engine). The lower the temperature of the cooling water or when the engine is started, the greater the extra injection quantity becomes.

Next referring back to FIG. 23, the overall mode of operation of the third embodiment will be described in detail hereinafter. As described hereinbefore, the first fuel injection nozzles 2017 are opened during the suction stroke of each cylinder in response to the pulse signals indicated at $(\tau_1)$, $(\tau_2)$, $(\tau_3)$ and $(\tau_4)$ in FIG. 27, so that the fuel may be injected during the suction stroke of each cylinder. Everytime when one of the first fuel injection nozzles 2017 is opened, the second fuel injection nozzles 2018 is opened in response to the pulse signal indicated at $(Y_5)$ in FIG. 27 so that the fuel may be injected into the throttle chamber 12 four times during each cycle of the engine and in synchronism with the suction stroke of each cylinder. The mode of operation during the suction stroke is substantially similar to that of the first embodiment.

As described above, according to the third embodiment of the present invention, the extra fuel is injected through the second injection nozzle 2018 into the throttle chamber 12 for starting or operation in cold weather. The complete vaporization of the injected fuel may be ensured as it passes through the throttle chamber 12 and the intake manifold 11 so that the ignition failure may be positively prevented. Thus, the smooth starting and operation in cold weather may be ensured. The compensation, expansion and exhaust strokes are substantially similar to those of the conventional four-cylinder internal combustion engines. According to the third embodiment, the fuel in the mixture is satisfactorily vaporized so that the positive and complete stratified combustion may be accomplished without causing any combustion lag or ignition failure. Therefore, the pollutant emission may be minimized.

In addition to the above operations, the third embodiment of the present invention may accomplish the following operations to be described hereinafter. Under the control of the extral fuel injection control device 2005 comprising read-only memories 2200, 2250 and 2500, a distribution circuit 2300, a multiplier 2450 and an adder 2550, a ratio of the injection quantity through the first injection nozzle 2017 opening at the intake manifold to the total injection quantity injected through both the first and second fuel injection nozzles 2017 and 2018 may be varied as indicated by the broken line curve shown in FIG. 14 while the ratio of the injection quantity through the second fuel injection nozzle 2018 may be varied as indicated by the solid-line curve shown also in FIG. 14 in response to the variation in intake air quantity Q. The greater the intake air quantity Q, the smaller the ratio of the injection quantity through the second fuel injection nozzles 2018 becomes. (When the intake air quantity exceeds 30 g/sec., the ratio of the fuel injection quantity through the second injection nozzle 2018 becomes zero). The extra fuel injection is made through the second fuel injection nozzle 2018 for starting or operation in cold weather so that the injection quantity through the second nozzle 2018 may be increased as indicated by the characteristic curves shown in FIGS. 21 and 22. However, when the temperature of the cooling water rises and the intake air quantity exceeds 30g/sec., the injection quantity through the second nozzle 2018 becomes zero. In general, when the engine is running at a high speed and/or under a high load, the intake air quantity is increased so the fuel in the mixture may be satisfactorily vaporized before ignited. The fuel injection through the second nozzle 2018 opening at the throttle chamber is for facilitating the satisfactory vaporization of the injected fuel. Therefore, it is meaningless to inject the fuel through the second nozzle when the satisfactory vaporization may be attained without the injection of the fuel through the second nozzle 2018. Furthermore the fuel injection through the second nozzle 2018 results in the slow response of the engine during the transient period and the undesirable non-uniform distribution of the mixture.

According to the third embodiment, however, the fuel in the mixture may be satisfactorily vaporized before ignited, so that the smooth starting and operation in cold weather may be ensured and the problems of the slow response and the non-uniform distribution may be overcome.

According to the third embodiment of the present invention, the stratified combustion of the mixture, in which the injected fuel is satisfactorily vaporized, may be accomplished not only as the starting and during the operation in cold weather but also under any other operating conditions without causing the slot response of the engine during the transition period and the non-uniform distribution so that the positive and satisfactory exhaust gas cleaning may be attained. In the first embodiment shown in FIGS. 2 to 12, it can be operated in the same manner as the above-described third embodiment, by a further electromagnetic valve.

What is claimed is:

1. An internal combustion engine comprising:
  a cylinder;
  a piston in said cylinder
  a cylinder head cooperating with said cylinder and said piston to define a main combustion chamber;
  an intake valve having a vale stem and a valve head connected thereto;
  an intake passage communicating with said main combustion chamber for supplying at least air thereto;
  a trap chamber disposed in said cylinder head and having at least one suction aperture;
  a throttle valve pivotally disposed in said intake passage for controlling the amount of the air passing therethrough;

a first fuel injection nozzle opening to said intake passage and directed towards said suction aperture of said trap chamber for injecting fuel into said intake passage to form a rich air-fuel mixture around said first fuel injection nozzle;

a second fuel injection nozzle opening to said intake passage downstream of and close to said throttle valve for injecting fuel thereinto to form a lean air-fuel mixture in said intake passage;

a fuel injection control system connected to said first and second fuel injection nozzles for controlling said first fuel injection nozzle to inject fuel at least one time during a suction stroke and said second fuel injection nozzle to inject fuel at least one time during any one of the strokes of said internal combustion engine;

a portion of said rich air-fuel mixture being introduced into said trap chamber through said suction aperture when said intake valve is opened and the remaining portion of said rich air-fuel mixture and said lean air-fuel mixture being introduced into said main combustion chamber when said intake valve is opened;

said trap chamber also having at least one discharge aperture through which residual gas remaining in said trap chamber is discharged into said main combustion chamber when said portion of said rich air-fuel mixture is introduced into said trap chamber, and said trap chamber being entirely closed except for said suction and discharge apertures, said suction and discharge apertures being small enough to achieve torch jet ignition and being always in communication with said main combustion chamber during the time when said intake valve is kept closed so that the torch jet can spurt through both of said suction and discharge apertures; and a spark plug having a set of electrodes for igniting the rich air-fuel mixture in said trap chamber.

2. An internal combustion engine as set forth in claim 1 wherein both said first and second fuel injection nozzles are actuated by pressurized fuel delivered thereto, thereby injecting the fuel; and said fuel injection control system includes a fuel supply device for intermittently delivering the pressurized fuel to said first and second fuel injection nozzles.

3. An internal combustion engine as set forth in Claim 2 wherein said fuel supply device comprises
a. a cylinder,
b. a discharge passage in communication with said cylinder,
c. a discharge valve located within said discharge passage,
d. a plunger fitted into said cylinder,
e. a cam for causing the reciprocal movement of said plunger in said cylinder in synchronism with the rotation of the engine so that the fuel may be pressurized within said cylinder and delivered into said discharge passage when said discharge valve is opened, and
f. distribution means having a fuel inlet port in communication with said discharge passage, fuel discharge ports in communication with said first and second fuel injection nozzles, respectively, and means for intercommunicating said fuel inlet with either of said fuel discharge ports.

4. An internal combustion engine as set forth in claim 3 wherein said cam causes two reciprocal movements of said plunger for each cycle of the engine, one reciprocal movement being made during the suction stroke while the other reciprocal movement, during another stroke except the suction stroke; and said distribution means delivers the fuel under pressure to said first fuel injection nozzle during the suction stroke and delivers the fuel under pressure to said second fuel injection nozzle during said another stroke.

5. An internal combustion engine as set forth in claim 1 wherein said fuel injection control system includes a fuel injection quantity ratio changing means for changing the ratio of the injection quantity through said first fuel injection nozzle to the injection quantity through said second fuel injection nozzle in response to the operating conditions of the engine.

6. An internal combustion engine as set forth in claim 5 wherein said first and second fuel injection nozzles are of the type in which fuel injection therefrom is controlled by a solenoid valve actuable in response to the electrical signal; and said fuel injection control system comprises
a. a fuel supply device for delivering the pressurized fuel to said first and second fuel injection nozzles,
b. a sensor means for generating the electrical signals representative of the operating conditions of the engine,
c. a control circuit for generating, in response to the output electrical signals from said sensor means, the electrical control signals for attaining the optimum injection quantity depending upon the operating conditions of the engine, and
d. injection quantity ratio changing means for distributing the electrical control signals from said control circuit into a predetermined ratio in response to the output signals from said sensor means thereby generating the electrical control signals for actuating said solenoid valves of said first and second fuel injection nozzles, respectively.

7. An internal combustion engine as set forth in claim 6 wherein said sensor means includes sensor for detecting the quantity of intake air; said control circuit generates the electrical signal representative of said intake air quantity; and said injection quantity ratio changing means generates the electrical control signals for actuating said solenoid valves of said first and second fuel injection nozzles so that when the intake air quantity is increased, the ratio of the injection quantity through said first fuel injection nozzle may be increased.

8. An internal combustion engine system as set forth in claim 7 wherein said sensor means further includes tachometer means for generating the electrical signal representative of the rotational speed of said engine; said control circuit includes a first circuit means for generating a first pulse signals with the pulse duration in proportion to the intake air quantity in response to the electrical output signal from said intake air quantity sensor, second circuit means for generating a second pulse signals with the pulse duration in inverse proportion to the rotational speed of the engine in response to the electrical output signal from said tachometer means, and third circuit means for executing the digital operation in response to said first and second pulse signals, thereby generating, a third pulse signal with the pulse duration corresponding to the intake air quantity per revolution of the engine; and said injection quantity changing means includes a read-only memory for generating the electrical output signal determined in accordance with a predetermined in response to the intake air quantity, and circuit means for dividing said third pulse signals from said control circuit in response to the electrical output signal from said read-only memory into a first group of said third pulse signals for actuating said solenoid valve of said first injection nozzle and a second group of said third pulse signals for actuating said solenoid valve of said second fuel injection nozzle.

9. An internal combustion engine as set forth in claim 1 wherein said fuel injection control device includes injection quantity increasing means for increasing the injection quantity through said second fuel injection nozzle during starting and operation in cold weather.

10. An internal combustion engine as set forth in claim 9 wherein said fuel injection control means further includes injection quantity ratio changing means for changing the ratio of the injection quantity through said first fuel injection nozzle to the injection quantity through said second injection nozzle in response to the operating conditions of the engine.

11. An internal combustion engine as set forth in claim 10 wherein said first and second fuel injection nozzles are of the type in which fuel injection therefrom is controlled by a solenoid controlled valve actuable in response to the electrical signals; and said fuel injection control system includes a fuel supply device for delivering the pressurized fuel to said first and second fuel injection nozzles, sensor means for generating the electrical output signals representative of the operating conditions of the engine; and a control device including
  i. a control circuit for generating, in response to the electrical output signals from said sensor means, the electrical control signal so as to attain the optimum injection quantity in response to the operating condition of the engine,
  ii. injection quantity changing means for distributing, in response to the electrical output signals from said sensor means, the electrical signals from said control circuit, thereby generating the electrical control signal for actuating said solenoid valve of said first fuel injection nozzle and the electrical control signal for actuating said solenoid valve of said second fuel injection nozzle, and
  iii. injection quantity increasing means for generating the extra injection quantity control signal to be combined with the electrical control signal for actuating said solenoid valve of said second fuel injection nozzle in response to the electrical output signals from said sensor means, thereby increasing the injection quantity through said second fuel injection nozzle during starting and operation in cold weather.

12. An internal combustion engine as set forth in claim 11 wherein said sensor means includes a sensor for detecting the intake air quantity, a sensor for detecting the temperature of the cooling water, and a starter switch for starting the engine; said control circuit generates the electrical output signal representative of the intake air quantity; and said fuel injection quantity ratio changing means generates the electrical control signals for actuating said solenoid valves of said first and second fuel injection nozzles so that when the intake air quantity is increased, the ratio of the fuel injection quantity through said first fuel injection nozzle may be increased; and said injection quantity increasing means generates, in response to the temperature of the cooling water and ON-OFF conditions of said starter switch, the electrical control signal for actuating said solenoid valve of said second fuel injection nozzle so that when the temperature of the cooling water is low and/or said starter switch is ON, the injection quantity through said second fuel injection nozzle may be increased.

13. An internal combustion engine as set forth in claim 12 wherein, said sensor system includes a tachometer means for generating the electrical output signal representative of the rotational speed of the engine; said control circuit includes first circuit means for generating a first pulse signal with the pulse duration in proportion to the intake air quantity in response to the electrical output signal from said intake air quantity sensor, second circuit means for generating a second pulse signal with pulse duration in inverse proportion to the rotational speed of the engine in response to the electrical output signal from said tachometer means, and third circuit means for executing the digital operation in response to the first and second pulse signals from said first and second circuit means, thereby generating a third pulse signal with pulse duration corresponding to the intake air quantity per revolution of the engine; said fuel injection quantity ratio changing means includes a first read-only memory means for generating the electrical output signal determined in accordance with a predetermined first characteristic in response to the intake air quantity, and forth circuit means for dividing, in response to the electrical output signal from said read-only memory means, said third pulse signals into a first pulse signal group for actuating said solenoid valve of said first fuel injection nozzle and a second pulse signal group for actuating said solenoid valve of said second fuel injection nozzle; and said injection quantity increasing means includes a second read-only memory means for generating the electrical output signal determined in accordance with a predetermined second characteristic in response to the temperature of the cooling water, fifth circuit means for generating, in response to the electrical output signals from said second read-only memory means, the pulse signals to be combined with said second pulse signal group thereby increasing the injection quantity through second fuel injection nozzle during operation in cold weather, a third read-only memory means for generating the electrical output signal determined in accordance with a predetermined third characteristic in response to the temperature of the cooling water, the sixth circuit means for generating, in response to the electrical output signals from said third read-only memory means, the pulse signals to be combined with the output pulse signals from said fifth circuit means thereby increasing the injection quantity through said second injection nozzle when said starter switch is closed.

14. An internal combustion engine as set forth in claim 1, wherein said first fuel injection nozzle is also directed towards a back surface of said valve head, whereby a part of the fuel injected from said first fuel injection nozzle during said suction stroke is effectively introduced into said trap chamber through said suction aperture.

15. An internal combustion engine as set forth in claim 1 wherein said trap chamber comprises:
  means disposed in said trap chamber for guiding said portion of said rich air-fuel mixture introduced in said trap chamber towards said set of electrodes.

* * * * *